United States Patent
Tsunooka

(10) Patent No.: US 7,983,831 B2
(45) Date of Patent: Jul. 19, 2011

(54) CONTROL APPARATUS AND METHOD FOR INTERNAL COMBUSTION ENGINE AND FUEL PROPERTY DETERMINING APPARATUS AND METHOD

(75) Inventor: Takashi Tsunooka, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 464 days.

(21) Appl. No.: 12/227,430

(22) PCT Filed: May 22, 2007

(86) PCT No.: PCT/IB2007/001316
§ 371 (c)(1),
(2), (4) Date: Nov. 18, 2008

(87) PCT Pub. No.: WO2007/135545
PCT Pub. Date: Nov. 29, 2007

(65) Prior Publication Data
US 2009/0112442 A1 Apr. 30, 2009

(30) Foreign Application Priority Data
May 23, 2006 (JP) ................................. 2006-142586

(51) Int. Cl.
*F02B 47/00* (2006.01)
*F02M 25/14* (2006.01)
(52) U.S. Cl. ......... 701/104; 123/1 A; 123/575; 123/576; 73/35.02
(58) Field of Classification Search ............... 701/103, 701/104; 123/1 A, 575, 576; 73/35.02–35.06
See application file for complete search history.

(56) References Cited

U.S. PATENT DOCUMENTS

| | | | |
|---|---|---|---|
| 4,402,212 A * | 9/1983 | Childs | 73/35.02 |
| 5,277,166 A | 1/1994 | Freeland | |
| 5,546,920 A | 8/1996 | Johansson | |
| 5,901,671 A | 5/1999 | Huff et al. | |
| 6,314,944 B1 * | 11/2001 | Majima | 123/491 |
| 6,609,413 B1 * | 8/2003 | De Craecker | 73/35.02 |
| 7,246,596 B2 * | 7/2007 | Yamaguchi et al. | 123/299 |
| 7,556,030 B2 * | 7/2009 | Ashida et al. | 123/575 |
| 7,762,127 B2 * | 7/2010 | Schneider et al. | 73/114.73 |
| 2003/0140715 A1 * | 7/2003 | Burke et al. | 73/863.84 |
| 2004/0182378 A1 * | 9/2004 | Oshimi et al. | 123/685 |
| 2006/0283423 A1 | 12/2006 | Ito | |
| 2007/0079647 A1 * | 4/2007 | Aoyama | 73/35.02 |
| 2008/0289401 A1 * | 11/2008 | Boerkel | 73/61.47 |
| 2010/0006050 A1 * | 1/2010 | Bromberg et al. | 123/1 A |

FOREIGN PATENT DOCUMENTS

DE      40 08 372 A1    9/1991

(Continued)

*Primary Examiner* — Erick Solis
(74) *Attorney, Agent, or Firm* — Oliff & Berridge, PLC

(57) ABSTRACT

A fuel feed chamber and a residual fuel chamber that are connectable to each other via a shutoff valve are provided in a fuel tank. When the fuel tank is refueled, the fuel feed chamber and the residual fuel chamber, which have been connected to each other so far, are disconnected and then fuel is fed only into the fuel feed chamber to refuel the fuel tank. When the engine is restarted after the refueling, only the fuel in the residual fuel chamber is supplied to the engine while the fuel feed chamber and the residual fuel chamber remain disconnected from each other, and the engine is controlled in accordance with the property of the fuel in the residual fuel chamber, which has been determined in advance.

18 Claims, 16 Drawing Sheets

FOREIGN PATENT DOCUMENTS

| | | |
|---|---|---|
| JP | A-03-210037 | 9/1991 |
| JP | A-05-005446 | 1/1993 |
| JP | A-05-209565 | 8/1993 |
| JP | B2-3441770 | 9/2003 |
| JP | A-2006-077683 | 3/2006 |
| WO | WO 2006/013870 A1 | 2/2006 |

* cited by examiner

CONTROL APPARATUS AND METHOD FOR INTERNAL COMBUSTION ENGINE AND FUEL PROPERTY DETERMINING APPARATUS AND METHOD

BACKGROUND OF THE INVENTION

1. Field of the Invention

The invention relates to a control apparatus and method for an internal combustion engine and a fuel property determining apparatus and method.

2. Description of the Related Art

For example, an internal combustion engine is known which can be powered by, as well as gasoline, various other fuels such as alcohol-blended liquid fuel that is obtained by adding alcohol to gasoline. However, because the property of gasoline and the property of such alcohol-blended liquid fuel are different and the concentration of alcohol in alcohol-blended liquid fuel is not always constant, the fuel property may vary upon refueling.

When the fuel property varies, for example, the value of the stoichiometric air-fuel ratio changes. Therefore, in the case where the fuel injection amount is controlled using a feedback correction coefficient based on the output from an air-fuel ratio sensor in the exhaust passage so as to bring the actual air-fuel ratio to the target air-fuel ratio, the average of the feedback correction coefficients indicates the fuel property. In view of this, there is known an internal combustion engine that is controlled in accordance with the fuel property indicated by the average of the feedback correction coefficient (Refer to Japanese patent publication No. JP-A-2006-77683).

In this internal combustion engine, after the property of the fuel in the fuel tank has changed due to refueling of the fuel tank, the value of the feedback correction coefficient gradually changes and then becomes stable at a value corresponding to the property of the fuel. Therefore, when the property of the fuel to be supplied to the engine has significantly varied as a result of refueling of the fuel tank, it takes a long time before the feedback correction coefficient becomes stable. During the period before the feedback correction coefficient becomes stable, the fuel property can not be accurately determined. Therefore, when the engine is restarted after refueling, the engine can not be appropriately controlled based on the fuel property for a while.

DISCLOSURE OF THE INVENTION

A first aspect of the invention relates to a control apparatus for an internal combustion engine in which a fuel feed chamber and a residual fuel chamber that can be selectively connected to and disconnected from each other are provided in a fuel tank. The control apparatus, when the fuel tank is to be refueled, disconnects the fuel feed chamber and the residual fuel chamber, which have been connected so far, from each other and then causes fuel to be fed only into the fuel feed chamber to refuel the fuel tank. Then, when the internal combustion engine is to be restarted after the refueling of the fuel tank, the control apparatus supplies only the fuel in the residual fuel chamber to the internal combustion engine while the fuel feed chamber and the residual fuel chamber remain disconnected from each other and controls the internal combustion engine in accordance with the property of the fuel in the residual fuel chamber, which has been determined in advance.

A second aspect of the invention relates to a control apparatus for an internal combustion engine in which a fuel feed chamber and a residual fuel chamber that can be selectively connected to and disconnected from each other are provided in a fuel tank. The control apparatus, when the fuel tank is to be refueled, disconnects the fuel feed chamber and the residual fuel chamber, which have been connected so far, from each other and then causes fuel to be fed only into the fuel feed chamber to refuel the fuel tank. Then, when the internal combustion engine has been restarted after the refueling of the fuel tank, the control apparatus supplies the fuel in the fuel feed chamber and the fuel in the residual fuel chamber to the internal combustion engine at a predetermined ratio while the fuel feed chamber and the residual fuel chamber remain disconnected from each other, and the control apparatus determines the property of the mixture of the fuels supplied to the internal combustion engine at the predetermined ratio based on the present value of an engine state amount. Then, the control apparatus determines the average property of the fuel in the fuel feed chamber and the fuel in the residual fuel chamber based on the property of the mixture of the fuels supplied to the internal combustion engine at the predetermined ratio and the property of the fuel in the residual fuel chamber, which has been determined in advance. Then, the control apparatus connects the fuel feed chamber and the residual fuel chamber to each other to allow the fuel in the fuel feed chamber and the fuel in the residual fuel chamber to be mixed with each other in the fuel tank. Then, the control apparatus supplies the mixture of the fuels in the fuel tank to the internal combustion engine from at least one of the fuel feed chamber and the residual fuel chamber and controls the internal combustion engine in accordance with the determined average property.

A third aspect of the invention relates to a fuel property determining apparatus for an internal combustion engine having a standard fuel chamber containing a standard fuel, the property of which is known in advance, and a reference fuel chamber containing a reference fuel, the property of which is unknown. The fuel property determining apparatus supplies the standard fuel and the reference fuel to the internal combustion engine at a predetermined ratio and determines at least one of the property of the reference fuel and the average property of the fuel in the standard fuel chamber and the fuel in the reference fuel chamber based on the present value of an engine state amount and the property of the standard fuel.

A fourth aspect of the invention relates to a method for controlling an internal combustion engine. This method includes the step of disconnecting, when a fuel tank is refueled, a fuel feed chamber and a residual fuel chamber from each other; the step of supplying, when the internal combustion engine is restarted after the refueling of the fuel tank, only the fuel in the residual fuel chamber to the internal combustion engine while the fuel feed chamber and the residual fuel chamber remain disconnected from each other; and the step of controlling the internal combustion engine in accordance with the property of the fuel in the residual fuel chamber that has been determined in advance.

A fifth aspect of the invention relates to a method for controlling an internal combustion engine. The method includes the steps of disconnecting, when a fuel tank is refueled, a fuel feed chamber and a residual fuel chamber from each other and supplying, when the internal combustion engine is restarted after the refueling of the fuel tank, the fuel in the fuel feed chamber and the fuel in the residual fuel chamber to the internal combustion engine at a predetermined ratio while the fuel feed chamber and the residual fuel chamber remain disconnected from each other; and the step of determining the property of the mixture of the fuels supplied to the internal combustion engine at the predetermined ratio based on an engine state amount that is obtained while the fuels are being supplied to the internal combustion engine at the predetermined ratio; the step of determining the average property of the fuel in the fuel feed chamber and the fuel in the residual fuel chamber based on the property of the mixture of the fuels supplied to the internal combustion engine at the predetermined ratio and the property of the fuel in the residual fuel chamber, which has been determined in advance; the steps of connecting, after the average property has been determined, the fuel feed chamber and the residual fuel chamber to each other so that the fuel in the fuel feed chamber and the fuel in the residual fuel chamber are mixed with each other and supplying the mixture of the fuels in the fuel tank to the internal combustion engine from at least one of the fuel feed chamber and the residual fuel chamber, and the step of controlling the internal combustion engine in accordance with the determined average fuel property.

A sixth aspect of the invention relates to a method for controlling an internal combustion engine. The method includes the step of supplying a standard fuel, which is contained in a standard fuel chamber and the property of which is known in advance, and a reference fuel, which is contained in a reference fuel chamber and the property of which is unknown, to the internal combustion engine at a predetermined ratio; and the step of determining at least one of the property of the reference fuel and the average property of the fuel in the standard fuel chamber and the fuel in the reference fuel chamber based on the present value of an engine state amount and the property of the standard fuel.

According to the first to six aspects of the invention, when the internal combustion engine is restarted after refueling, the internal combustion engine can be appropriately controlled in accordance with the fuel property.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EXEMPLARY EMBODIMENTS

Figure 1:
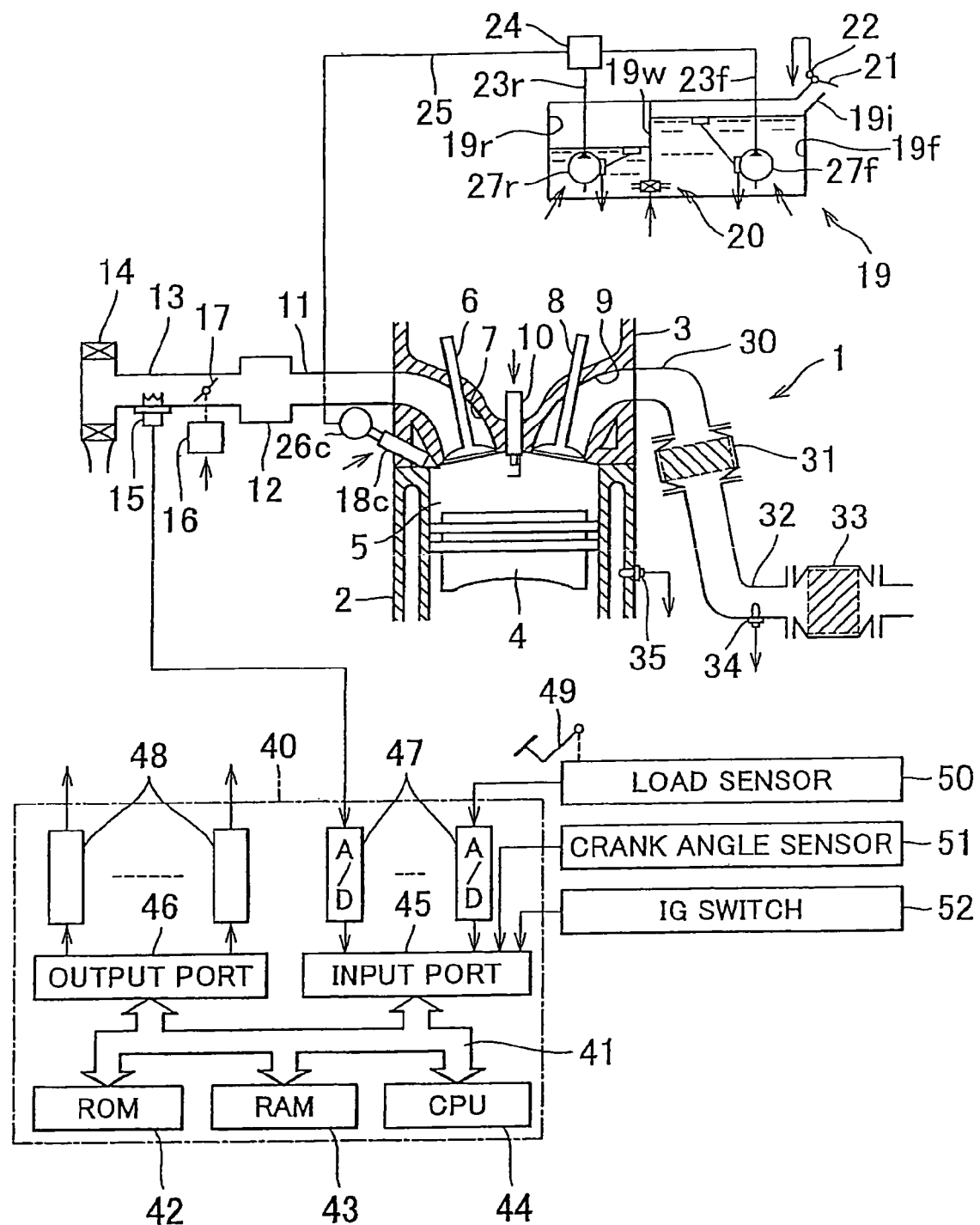
FIG. 1 is a view showing the entire configuration of an internal combustion engine.

FIG. 1 is a view showing the configuration of a spark ignition type internal combustion engine to which the invention has been applied. Note that the invention may also be applied to compression ignition type internal combustion engines.

The spark ignition type internal combustion engine in this exemplary embodiment has a four-cylinder engine unit 1 having a cylinder block 2 and a cylinder head 3. For each cylinder, there are provided a piston 4, a combustion chamber 5, an intake valve 6, an intake port 7, an exhaust valve 8, an exhaust port 9, and a spark plug 10. Each intake port 7 is connected to a surge tank 12 via an intake manifold 11. The surge tank 12 is connected to an air cleaner 14 via an intake duct 13. In the intake duct 13 are provided an airflow meter 15 for detecting an intake mass flow rate Ga and a throttle valve 17 that is driven by a step motor 16. An electrically controlled fuel injection valve 18c is provided in the combustion chamber 5 of each cylinder to directly inject fuel into the combustion chamber 5. Note that the fuel injection valve 18c will hereinafter be referred to as "in-cylinder injection valve."

In a fuel tank 19, a fuel feed chamber 19f and a residual fuel chamber 19r are provided. The fuel feed chamber 19f and the residual fuel chamber 19r are partitioned from each other by a partition wall 19w. A communication hole is formed in the partition wall 19w and an electromagnetically-driven shutoff valve 20 is provided in the communication hole. Thus, when the shutoff valve 20 is open, the fuel feed chamber 19f and the residual fuel chamber 19r are in communication with each other and the fuels in the respective chambers are mixed with each other. When the shutoff valve 20 is closed, the communication between the fuel feed chamber 19f and the residual fuel chamber 19r is shut off. A fuel inlet 19i is formed for the fuel feed chamber 19f while no fuel inlet is provided for the residual fuel chamber 19r. A fuel inlet sensor 22 is provided at a lid 21 for the fuel inlet 19i. The fuel inlet sensor 22 outputs signals indicating that the fuel inlet 19i is open and the fuel tank 19 is to be refueled.

Fuel supply pipes 23f, 23r are connected to the fuel feed chamber 19f and the residual fuel chamber 19r, respectively. The fuel supply pipes 23f, 23r are both connected to a fuel supply pipe 25 via a common flow rate adjusting device 24. The fuel supply pipe 25 is connected to the respective in-cylinder injection valves 18c via a delivery pipe 26c that serves as a fuel pressure accumulating chamber. Fuel pumps 27f, 27r are provided on the fuel supply pipes 23f and 23r, respectively. Each of the fuel pumps 27f, 27r is an electronically controlled pump that can vary the discharge rate. In the example shown in FIG. 1, the fuel feed chamber pump 27f and the residual fuel chamber pump 27r are arranged within the fuel feed chamber 19f and the residual fuel chamber 19r, respectively. However, the fuel feed chamber pump 27f and the residual fuel chamber pump 27r may alternatively be arranged outside of the fuel feed chamber 19f and the residual fuel chamber 19r, respectively. Note that the fuel pumps 27f, 27r will hereinafter be referred to as "fuel feed chamber pump 27f" and "residual fuel chamber pump 27r", respectively, where necessary. The fuel feed chamber pump 27f pumps up the fuel from the fuel feed chamber 19f and sends it to the fuel flow rate adjusting device 24 and the residual fuel chamber pump 27r pumps up the fuel from the residual fuel chamber 19r and sends it to the fuel flow rate adjusting device 24. The fuels are then supplied from the fuel flow rate adjusting device 24 to the respective in-cylinder injection valves 18c via the fuel supply pipe 25 and the delivery pipe 26c. A fuel amount sensor is attached to the fuel feed chamber 19f to detect a fuel amount QFf, the amount of fuel in the fuel feed chamber 19f, and another fuel amount sensor is attached to the residual fuel chamber 19r to detect a fuel amount QFr, the amount of fuel in the residual fuel chamber 19r. Note that in this exemplary embodiment any sensor for identifying the property of fuel, e.g., the fuel flowing in the fuel supply pipe 25, is not provided in the fuel supply pipe 25.

The fuel flow rate adjusting device 24 adjusts the amount of fuel to be supplied from the fuel feed chamber 19f to the fuel supply pipe 25 and the amount of fuel to be supplied from the residual fuel chamber 19r to the fuel supply pipe 25 such that they are supplied to the fuel supply pipe 25 at a desired ratio. More specifically, when the fuel feed chamber pump 27f and the residual fuel chamber pump 27r are both operating, the fuel flow rate adjusting device 24 adjusts the ratio between the amount of fuel supplied from the fuel feed chamber 19f to the internal combustion engine via the respective in-cylinder injection valves 18c and the amount of fuel supplied from the residual fuel chamber 19r to the internal combustion engine via the respective in-cylinder injection valves 18c such that the proportion of the amount of fuel from the fuel feed chamber 19f is q (0<q<1) and the proportion of the amount of fuel from the residual fuel chamber 19r is (1−q). Needless to say, when only the fuel feed chamber pump 27f is operating, only the fuel in the fuel feed chamber 19f is supplied to the fuel flow rate adjusting device 24 and then to the respective in-cylinder injection valves 18c. On the other hand, when only the residual fuel chamber pump 27r is operating, only the fuel in the residual fuel chamber 19r is supplied to the fuel flow rate adjusting device 24 and then to the respective in-cylinder injection valves 18c.

During a normal operation state, which is not immediately after refueling of the fuel tank 19, the shutoff valve 20 is open and the fuel feed chamber pump 27f operates while the residual fuel chamber pump 27r is stopped. Thus, during the normal operation state, the fuel in the fuel feed chamber 19f and the fuel in the residual fuel chamber 19r are supplied to the internal combustion engine, that is, to the in-cylinder injection valves 18c, via the fuel feed chamber pump 27f. While fuel is supplied to the internal combustion engine by operating the fuel feed chamber pump 27f during the normal operation state in this exemplary embodiment, fuel may alternatively be supplied to the internal combustion engine by operating the residual fuel chamber pump 27r or operating both of the fuel feed chamber pump 27f and the residual fuel chamber pump 27r during the normal operation.

The internal combustion engine shown in FIG. 1 runs on, as its fuel, fossil liquid fuel (e.g., gasoline, diesel oil), liquid alcohol, or mixture of fossil fuel and liquid alcohol. In such a case, the property of fuel is determined based on, for example, the percentage (or concentration) of a specific component, viscosity, evaporation characteristic, average molecular weight, etc.

The exhaust port 9 is connected via an exhaust manifold 30 to an auxiliary catalyst 31 having a small catalytic capacity. The auxiliary catalyst 31 is connected via an exhaust passage 32 to a main catalyst 33 having a large catalytic capacity. An air-fuel ratio sensor 34 is provided in the exhaust passage 32 to detect air-fuel ratios.

An electronic control unit 40 is constituted by a digital computer having a ROM (Read Only Memory) 42, a RAM (Random Access Memory) 43, a CPU (Central Processing Unit (microprocessor)) 44, an input port 45, and an output port 46, which are all connected to each other via a bidirectional bus 41. A coolant temperature sensor 35 is attached to the engine unit 1 to detect the temperature of the coolant circulated through the engine unit 1. A load sensor 50 is connected to an accelerator pedal 49 to detect the depression of the accelerator pedal 49. The depression of the accelerator pedal 49 indicates the required load. The signals output from the airflow meter 15, the fuel inlet sensor 22, the fuel amount sensors attached to the fuel feed chamber pump 27f and the residual fuel chamber pump 27r, the air-fuel ratio sensor 34, the coolant temperature sensor 35, and the load sensor 50 are input to the input port 45 via corresponding A/D converters 47. Also connected to the input port 45 are a crank angle sensor 51 that outputs a pulse each time the crank shaft rotates 30° and an ignition (IG) switch 52 that outputs a pulse indicating whether the ignition is on or off. The CPU 44 calculates the engine speed Ne based on the output pulse of the crank angle sensor 51. The spark plug 10, the step motor 16, the in-cylinder injection valves 18c, the shutoff valve 20, the fuel feed chamber pump 27f, and the residual fuel chamber pump 27r are connected via corresponding drive circuits 48 to the output port 46 and controlled by the signals output from the electronic control unit 40. Note that in this exemplary embodiment, power is supplied to the electronic control unit 40 also when the ignition switch 52 is off.

In the internal combustion engine shown in FIG. 1, a fuel injection duration TAU is calculated by the expression (1) indicated below.

$$TAU = TB \cdot (1 + FAF + kI + kF) \quad (1)$$

In the above expression, "TB" represents a standard fuel injection duration, "FAF" is a feedback correction coefficient, "kI" is an increase correction coefficient, and "kF" is a fuel property correction coefficient.

Here, the "standard fuel" means a fuel having a standard property. Thus, the standard fuel injection duration TB represents the time for which, assuming that only standard fuel is supplied to the internal combustion engine, the fuel needs to be injected to achieve the target air-fuel ratio. The standard fuel injection duration TB is recorded in the ROM 42 in advance as a function of values indicating the operation conditions of the internal combustion engine, such as the outputs of the airflow meter 15 and the engine speed.

The feedback correction coefficient FAF is used to bring the actual air-fuel ratio to the target air-fuel ratio and is calculated based on the air-fuel ratio detected by the air-fuel ratio sensor 34. The value of the feedback correction coefficient FAF changes with respect to zero as its center and remains zero when correction is unnecessary.

The increase correction coefficient kI includes increase correction coefficients used upon start-up of the internal combustion engine, increase correction coefficient used when accelerating the vehicle, and so on. The increase correction coefficient kI remains zero when correction is unnecessary.

The value of the fuel property correction coefficient kF is determined in accordance with the property of the fuel supplied to the engine. The value of the fuel property correction coefficient kF remains zero when standard fuel is being supplied to the engine.

Figure 2:
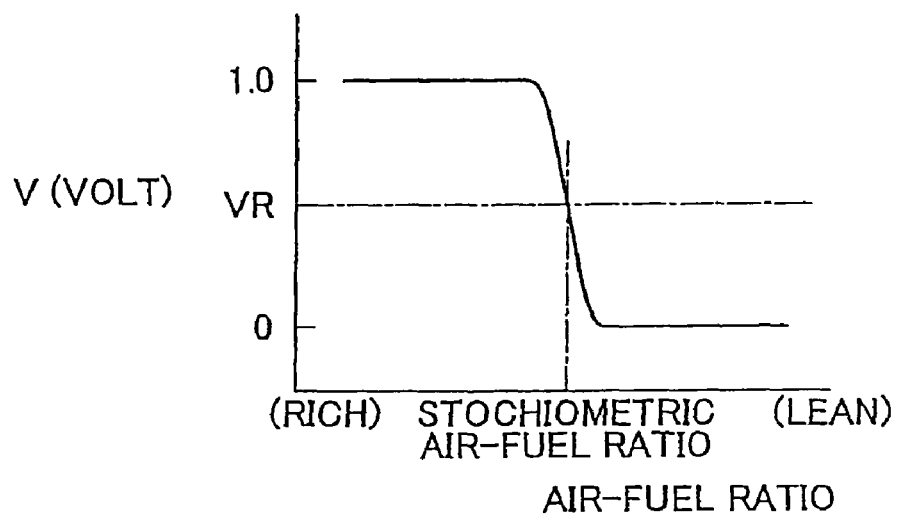
FIG. 2 is a chart illustrating the output of an oxygen concentration sensor.

In the following, the method for calculating the feedback correction coefficient FAF will be briefly described with reference to FIG. 2 to FIG. 4. In this exemplary embodiment, the target air-fuel ratio is set to the stoichiometric air-fuel ratio and an oxygen concentration sensor that detects the concentration of oxygen in exhaust gas is used as the air-fuel ratio sensor 34. The output voltage V of the oxygen concentration sensor 34 substantially equals a reference voltage VR when the air fuel ratio is equal to the stoichiometric air-fuel ratio. The output voltage V is nearly 1.0 V when the air-fuel ratio is richer than the stoichiometric air-fuel ratio and is nearly 0 V when the air-fuel ratio is leaner than the stoichiometric air-fuel ratio.

Figure 3:
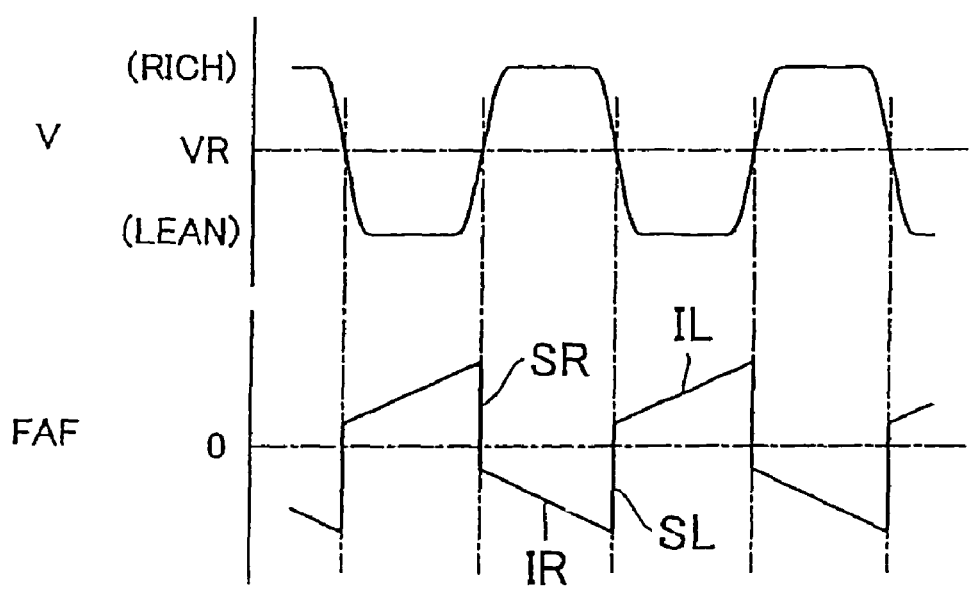
FIG. 3 is a time chart illustrating a method for calculating a feedback correction coefficient FAF.
Figure 4:
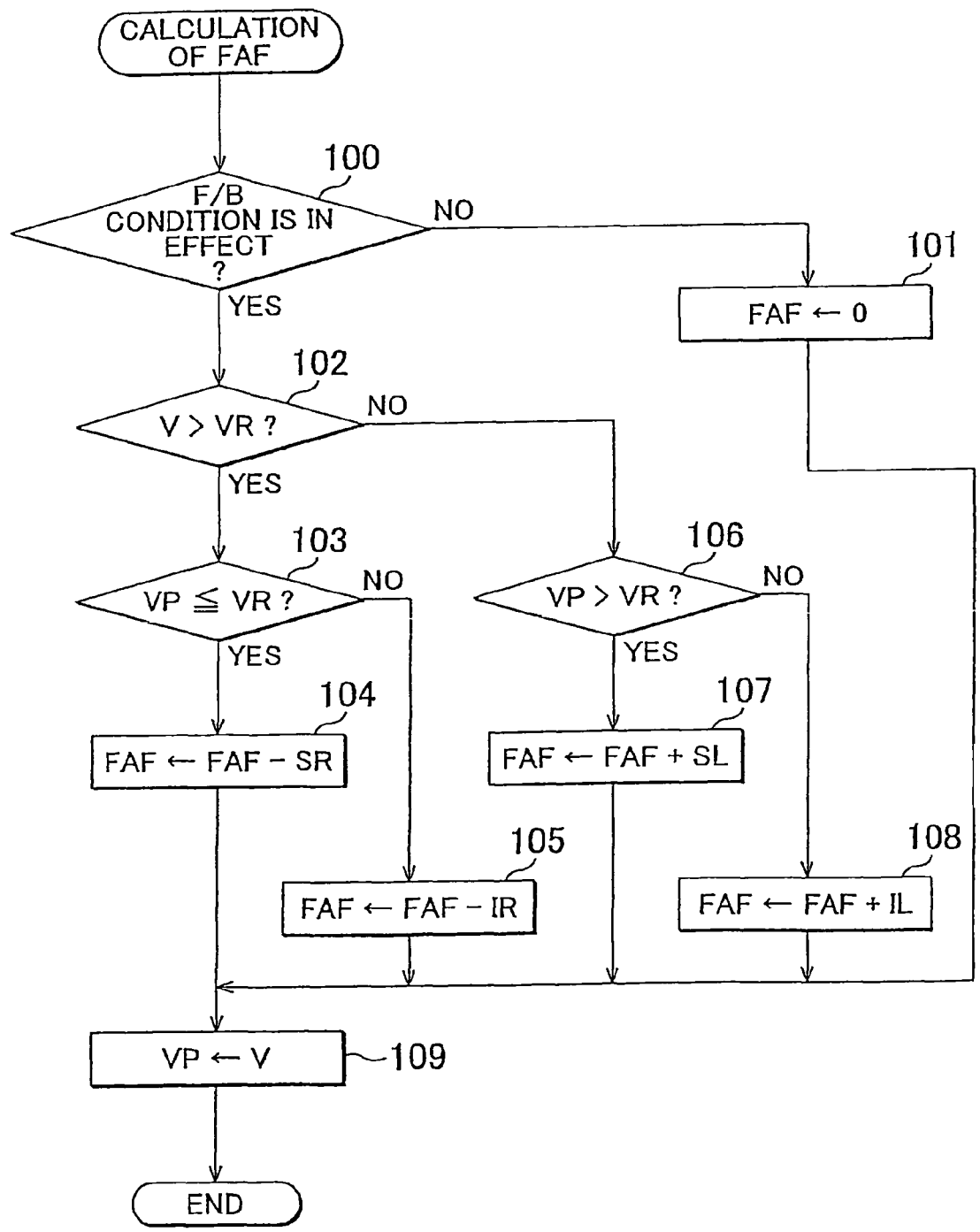
FIG. 4 is a flowchart illustrating a routine for calculating the feedback correction coefficient FAF.

FIG. 4 is a routine for calculating the feedback correction coefficient FAF. Referring to FIG. 4, after the start of the routine, it is determined in step 100 whether a condition for executing the feedback control is presently in effect. In this exemplary embodiment, it is determined that the condition for executing the feedback control is in effect if the air-fuel ratio sensor 34 has been already activated and the engine has been already warmed up. Otherwise, it is determined that the condition for executing the feedback control is not in effect. If it is determined that the condition for executing the feedback control is not in effect, the control then proceeds to step 101 where the feedback correction coefficient FAF is set to zero. Conversely, if it is determined in step 100 that the condition is in effect, the control then proceeds to step 102. In step 102, it is determined whether the output voltage V of the oxygen concentration sensor 34 is higher than the reference voltage VR. If V>VR, the control then proceeds to step 103. In step 103, it is determined whether a previous output voltage VP that is the output voltage of the oxygen concentration sensor 34 in the last cycle of the routine is equal to or lower than the reference voltage VR. If so (VP≦VR), it indicates that the air-fuel ratio has changed from a lean air-fuel ratio to a rich air-fuel ratio. In this case, the control proceeds to step 104. In step 104, the value of the feedback correction coefficient FAF is reduced by a skip value SR, so that the feedback correction coefficient FAF sharply decreases as indicated in FIG. 3. Then, the control proceeds to step 109. On the other hand, if it is determined in step 103 that the previous output voltage VP is higher than the reference voltage VR (VP>VR), it is indicates that the air-fuel ratio has been rich (lower than the stoichiometric air-fuel ratio). In this case, the control proceeds to step 105. In step 105, the value of the feedback correction coefficient FAF is reduced by an integration value IR (<<SR), so that the feedback correction coefficient FAF gradually decreases as indicated in FIG. 3. Then, the control proceeds to step 109. On the other hand, back to step 102, if it is determined in this step that the output voltage V is equal to or lower than the reference voltage VR (V≦VR), the control then proceeds to step 106. In step 106, it is determined whether the previous output voltage VP, which is the output voltage of the oxygen concentration sensor 34 in the last cycle of the routine, is higher than the reference voltage VR. If so (VP>VR), it indicates that the air-fuel ratio has changed from a rich air-fuel ratio to a lean air-fuel ratio. In this case, the control proceeds to step 107. In step 107, the value of the feedback correction coefficient FAF is increased by a skip value SL, so that the feedback correction coefficient FAF shapely increases as indicated in FIG. 3. Then, the control proceeds to step 109. Conversely, if it is determined in step 106 that the previous output voltage VP is equal to or lower than the reference voltage VR (VP≦VR), it indicates the air-fuel ratio has been lean (higher than the stoichiometric air-fuel ratio). In this case, the control proceeds to step 108. In step 108, the value of the feedback correction coefficient FAF is increased by an integration value IL (<<SL), so that the feedback correction coefficient FAF gradually increases. Then, the control proceeds to step 109. In step 109, the output voltage V of the air-fuel ratio sensor 34 in the present cycle of the routine is recorded as the previous output voltage VP.

Meanwhile, in a state where the feedback correction coefficient FAF is stable, that is, in a state where the air-fuel ratio is kept substantially equal to the stoichiometric air-fuel ratio, the average of the feedback correction coefficient FAF (i.e., the center of change of the feedback correction coefficient FAF) depends on the value of the stoichiometric air-fuel ratio, and the value of the stoichiometric air-fuel ratio depends on the property of the fuel being supplied to the engine. As such, as the property of the fuel supplied to the engine changes, an average feedback correction coefficient FAFA changes. That is, the average feedback correction coefficient FAFA is a parameter indicating the property of the fuel being supplied to the engine. More precisely, the average feedback correction coefficient FAFA indicates the deviation of the property of the supplied fuel from the standard property. Also, the amount by which the average feedback correction coefficient FAFA changes in response to a change in the property of the fuel supplied to the engine indicates the amount of change in the property of the same fuel.

Thus, when the average feedback correction coefficient FAFA changes, adding the amount of change in the average feedback correction coefficient FAFA to the fuel property correction coefficient kF makes the fuel property correction coefficient kF accurately identify the new property of the fuel supplied to the engine. Also, at this time, if the feedback correction coefficient FAF is reduced by the amount added to the fuel property correction coefficient kF, the fuel injection duration TAU remains unchanged as evident from the foregoing expression (1).

Figure 5:
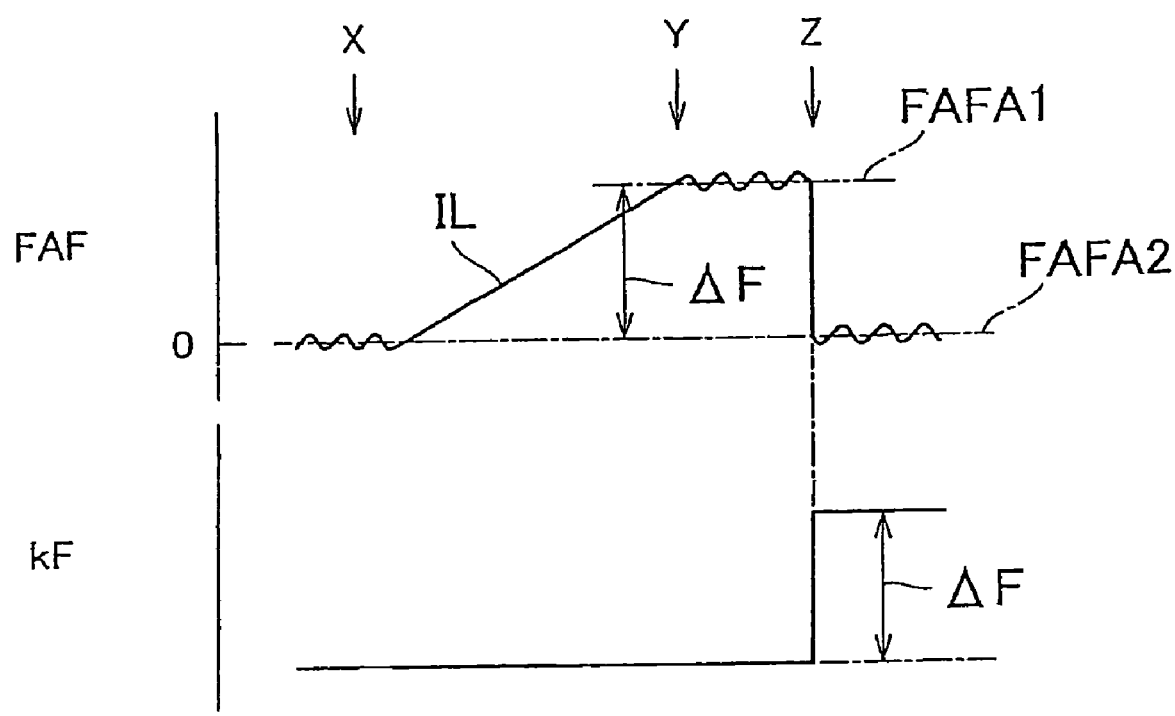
FIG. 5 is a time chart illustrating a method for calculating a fuel property correction coefficient kF.

More specifically, in the example shown in FIG. 5, the property of fuel supplied to the engine changes at time X, and then the feedback correction coefficient FAF begins to increase by the integration value IL. Then, at time Y, the feedback correction coefficient FAF becomes stable and the air-fuel ratio starts to stay at or near the stoichiometric level, so that the average feedback correction coefficient increases from FAFA2 to FAFA1 by ΔF. Then, at time Z, the fuel property correction coefficient kF is increased by ΔF and the feedback correction coefficient FAF is reduced by ΔF. Note that the value of the fuel property correction coefficient kF and the value of the feedback correction coefficient FAF are adjusted in the manner described above also when the feedback correction coefficient FAF decreases in response to a change in the property of fuel supplied to the engine.

According to this control, even when the property of fuel supplied to the engine has changed as a result of the fuel tank 19 having been refueled with fuel having a different property from that of the fuel remaining in the fuel tank 19, the fuel property correction coefficient kF is adjusted to a value that accurately identifies the new property of the fuel supplied to the engine, and therefore the air-fuel ratio can be reliably controlled to the stoichiometric level by executing the foregoing air-fuel ratio control with the fuel property correction coefficient kF.

The property of the fuel supplied to the engine can be determined also based on various values indicating the state of the engine (will be referred to as "engine state amounts"), such as the optimum ignition timing (e.g., MBT (Minimum Advance for Best Torque)), the knock limit of the engine, the combustion pressure, the time at which the combustion pressure peaks, and the idling speed of the engine, as well as based on the average feedback correction coefficient FAFA. Thus, the fuel property correction coefficient kF may be calculated based on one or more of these values (e.g., the optimum ignition timing). That is, generally speaking, the property of fuel being supplied to the engine can be determined based on the present value of a specific engine state amount.

However, as evident from FIG. 5, when the property of fuel changes after the fuel tank 19 has been refueled, the value of the feedback correction coefficient FAF is changed little by little using small integration values IR, IL (Refer to FIG. 3). Therefore, in particular, when the fuel property has significantly changed, it takes a long time before the value of the feedback correction coefficient FAF becomes stable, that is, before the fuel property correction coefficient kF is updated to a value accurately identifying the property of the fuel that is supplied to the engine after the fuel tank 19 has been refueled.

To cope with this, in this exemplary embodiment, specific control procedures are executed before and after refueling the fuel tank 19, as will be described with reference to FIG. 6 in the following.

Figure 6:
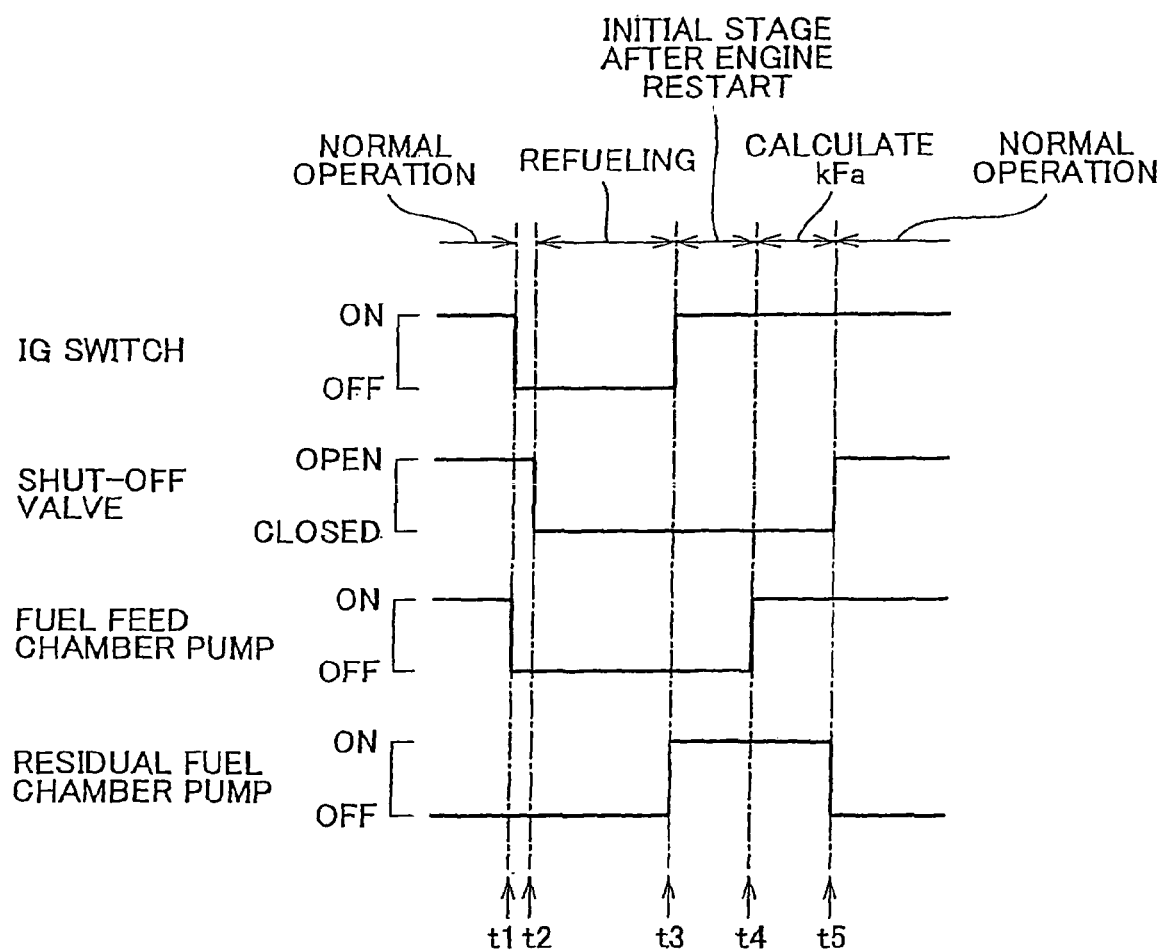
FIG. 6 is a time chart illustrating an exemplary embodiment of the invention.

Referring to FIG. 6, during the normal operation, which is not immediately after refueling of the fuel tank 19, the shutoff valve 20 is kept open and only the fuel feed chamber pump 27$f$ operates. Then, in response to the ignition switch 52 being turned off at t1 in FIG. 6 to stop the engine, the fuel feed chamber pump 27$f$ is stopped. Then, in response to the fuel inlet 19$i$ being opened at t2 to refuel the fuel tank 19, the shutoff valve 20 is closed, so that the fuel feed chamber 19$f$ and the residual fuel chamber 19$r$ of the fuel tank 19 are disconnected from each other. Then, new fuel is fed only into the fuel feed chamber 19$f$ via the fuel inlet 19$i$. At this time, the new fuel is not fed into the residual fuel chamber 19$r$ and therefore the property of the fuel in the residual fuel chamber 19$r$ remains the same as that of the fuel that was supplied to the engine before the refueling of the fuel tank 19. On the other hand, as a result of the refueling of the fuel tank 19, the fuel feed chamber 19$f$ comes to contain a mixture of the fuel that has been in the fuel feed chamber 19$f$ since before the refueling of the fuel tank 19 and the fuel that has been newly fed into the fuel feed chamber 19$f$ to refuel the fuel tank 19.

After the refueling of the fuel tank 19, in response to the ignition switch 52 being turned on at t3 to restart the engine, only the residual fuel chamber pump 27$r$ is activated with the shutoff valve 20 kept closed, so that only the fuel in the residual fuel chamber 19$r$ is supplied to the engine. Hereinafter, the value of the fuel property correction coefficient kF for the property of the fuel in the residual fuel chamber 19$r$ will be referred to as "fuel property correction coefficient kFr". The fuel property correction coefficient kFr has already been calculated prior to the refueling of the fuel tank 19. Therefore, by setting the value of the fuel property correction coefficient kFr as the value of the fuel property correction coefficient kF, the engine can be appropriately controlled in accordance with the property of the fuel being supplied to the engine.

Next, in response to a predetermined calculation condition coming into effect at t4, the residual fuel chamber pump 27$r$ is activated with the shutoff valve 20 kept closed. That is, from this point, both of the fuel feed chamber pump 27$f$ and the residual fuel chamber pump 27$r$ operate and an average fuel property correction coefficient kFa identifying the average property of the fuel in the fuel feed chamber 19$f$ and the fuel in the residual fuel chamber 19$r$ is calculated. Note that "the average property of the fuel in the fuel feed chamber 19$f$ and the fuel in the residual fuel chamber 19$r$" represents the property of the fuel in the fuel tank 19 which is obtained while the shutoff valve 20 is open.

Next, in response to the calculation of the average fuel property correction coefficient kFa being completed at t5, the shutoff valve 20 is opened and the residual fuel chamber pump 27$r$ is stopped, so that only the fuel feed chamber pump 27$f$ continues to operate. That is, at this time, the normal operation is resumed by setting the value of the average fuel property correction coefficient kFa as the value of the fuel property correction coefficient kF. As such, even after refueling the fuel tank 19, the engine can be appropriately controlled in accordance with the property of fuel supplied to the engine.

Next, the method for calculating the average fuel property correction coefficient kFa will be described. As mentioned above, the average fuel property correction coefficient kFa represents the average property of the fuel in the fuel feed chamber 19$f$ and the fuel in the residual fuel chamber 19$r$, and therefore it can be expressed by the expression (2) indicated below.

$$kFa=\{QFf \cdot kFf+QFr \cdot kFr\}/(QFf+QFr) \qquad (2)$$

In the expression above, "kFf" is a fuel property correction coefficient indicating the property of the fuel in the fuel feed chamber 19$f$ that is obtained while the shutoff valve 20 is closed after refueling the fuel tank 19.

Therefore, the value of the average fuel property correction coefficient kFa can be obtained by calculating the fuel property correction coefficient kFf for the fuel in the fuel feed chamber 19$f$ and detecting the fuel amount QFf of the fuel in the fuel feed chamber 19$f$ and the fuel amount QFr of the fuel in the residual fuel chamber 19$r$ by the respective fuel amount sensors.

On the other hand, in a state where both of the fuel feed chamber pump 27$f$ and the residual fuel chamber pump 27$r$ are operating, the fuel in the fuel feed chamber 19$f$ and the fuel in the residual fuel chamber 19$r$ are mixed at the ratio of q:(1−q) by the fuel flow rate adjusting device 24 (See FIG. 1) and the fuel mixture is then supplied to the engine. If the fuel property correction coefficient indicating the property of the mixed fuel is denoted "kFq", the mixed fuel property correction coefficient kFq is expressed by the expression indicated below.

$$kFq=q \cdot kFf+(1-q) \cdot kFr$$

Thus, the fuel property correction coefficient kFf is expressed by the expression (3) indicated below.

$$kFf=\{kFq-(1-q) \cdot kFr\}/q \qquad (3)$$

Thus, in this exemplary embodiment, when the average fuel property correction coefficient kFa is to be calculated (t4 in FIG. 6), both of the fuel feed chamber pump 27$f$ and the residual fuel chamber pump 27$r$ are operated with the shutoff valve 20 kept closed, and the mixed fuel property correction coefficient kFq is calculated based on the amount of change in the average feedback correction coefficient FAFA, the average of the feedback correction coefficient FAF, which is obtained during this time. Then, the fuel property correction coefficient kFf is calculated by the expression (3), and the average fuel property correction coefficient kFa is then calculated by the expression (2).

That is, it can be said that, in this exemplary embodiment, the fuel in the residual fuel chamber 19$r$, the property of which has been known beforehand, and the fuel in the fuel feed chamber 19$f$, the property of which is unknown, are mixed at a predetermined ratio and then supplied to the engine, and based on the engine state amount obtained at this time and the property of the fuel in the residual fuel chamber 19r (kFr), the property of the fuel in the fuel feed chamber 19f (kFf) or the average property of the fuel in the fuel feed chamber 19f and the fuel in the residual fuel chamber 19r (kFa) is determined.

The calculation of the average fuel property correction coefficient kFa is started in response to the foregoing calculation condition coming into effect (t4 in FIG. 6). In this exemplary embodiment, the mixed fuel property correction coefficient kFq is calculated to calculate the average fuel property correction coefficient kFa, and the condition for executing the feedback control must be in effect when calculating the mixed fuel property correction coefficient kFq. Therefore, in this exemplary embodiment, the foregoing calculation condition is considered not to be in effect until the feedback control execution condition comes into effect. In other words, the foregoing calculation condition comes into effect in response to the feedback control execution condition coming into effect.

After the start of the calculation of the average fuel property correction coefficient kFa, the fuel for the engine is switched from the fuel in the residual fuel chamber 19r to the fuel obtained by mixing of the fuel in the fuel feed chamber 19f and the fuel in the residual fuel chamber 19r at the predetermined ratio (q:(1−q)). In this case, the engine may not be controlled appropriately in accordance with the property of the fuel being supplied to the engine during the period before the value of the feedback correction coefficient FAF becomes stable at a certain level after deviating from zero, that is, during the period before the calculation of the mixed fuel property correction coefficient kFq is finished. Therefore, in such a case, it is preferable to minimize the time taken for the calculations of the mixed fuel property correction coefficient kFq and the average fuel property correction coefficient kFa. In view of this, preferably, the proportion q of the fuel from the fuel feed chamber 19f is set to be as small as possible, for example, to be smaller than 0.5.

Meanwhile, when the mixed fuel property correction coefficient kFq and the average fuel property correction coefficient kFa are to be calculated, if the fuel in the fuel feed chamber 19f and the fuel in the residual fuel chamber 19r are supplied at the ratio equal to the ratio between the fuel amount QFf of the fuel in the fuel feed chamber 19f and the fuel amount QFr of the fuel in the residual fuel chamber 19r (QFf/(QFf+QFr):QFr/(QFf+QFr)), the calculated value of the mixed fuel property correction coefficient kFq equals the value of the average fuel property correction coefficient kFa that would be obtained with the fuel in the fuel tank 19 when the shutoff valve 20 is open. Thus, in this case, the average fuel property correction coefficient kFa can be directly and easily calculated.

Figure 7:
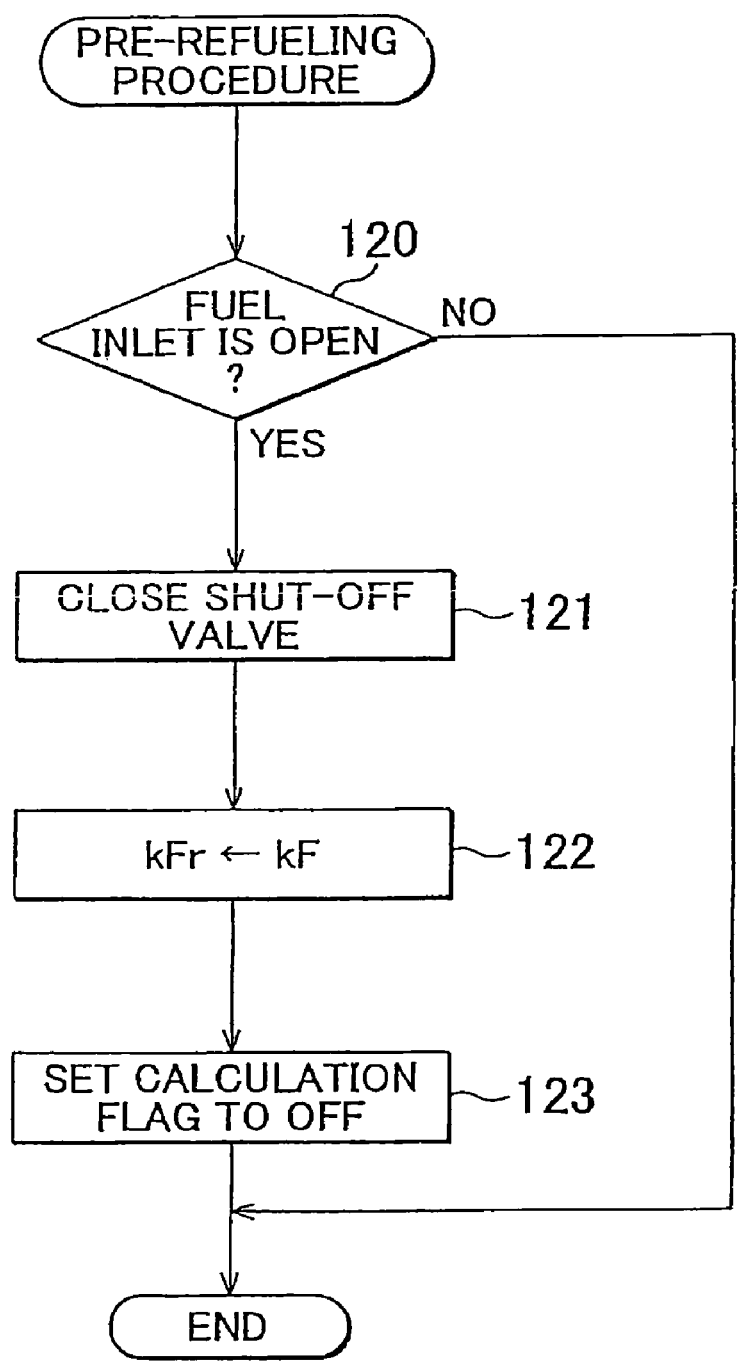
FIG. 7 is a flowchart illustrating a control routine executed before refueling.

FIG. 7 illustrates the routine of the control procedure that is executed before refueling of the fuel tank 19 in this exemplary embodiment. This routine is repeatedly executed as an interrupt at predetermined time intervals.

Referring to FIG. 7, after the start of the routine, it is first determined in step 120 whether the fuel inlet 19i has been opened. If the fuel inlet 19i has not been opened, it indicates that the fuel tank 19 is not to be refueled. In this case, the present cycle of the control routine ends. Conversely, if it is determined in step 120 that the fuel inlet 19i has been opened, it indicates that the fuel tank 19 is to be refueled. In this case, the control proceeds to step 121 where the shutoff valve 20 is closed. Then, in step 122, the value of the fuel property correction coefficient kF obtained at this time is recorded in the RAM 43 as the value of the fuel property correction coefficient kFr. Then, in step 123, a calculation flag is set to off. This flag is set to off in response to the fuel tank 19 being refueled and is set to on in response to the calculation of the average fuel property correction coefficient kFa being finished.

Figure 8:
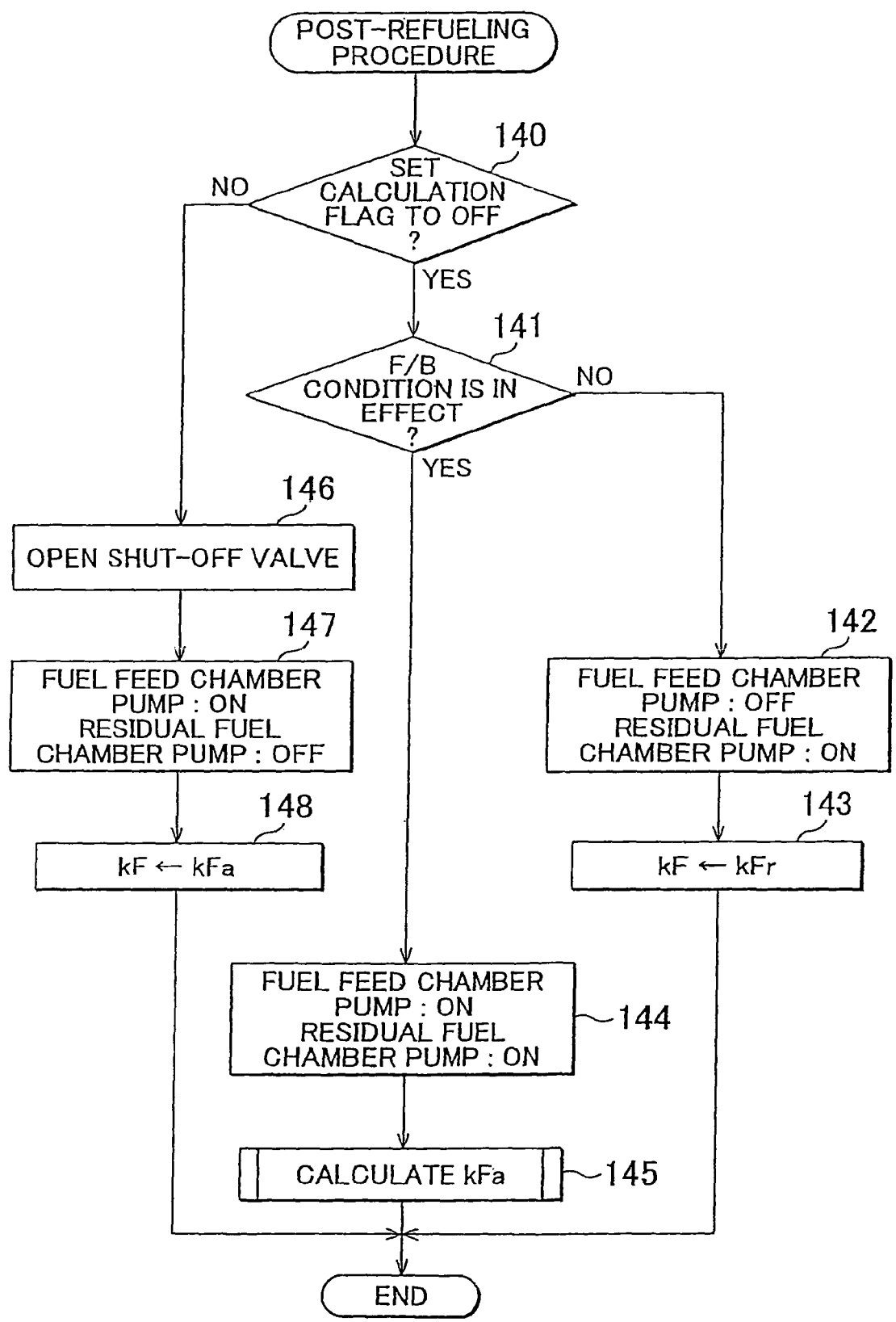
FIG. 8 is a flowchart illustrating a control routine executed after refueling.

FIG. 8 illustrates the routine of the control procedure that is executed after refueling the fuel tank 19 in this exemplary embodiment. This routine is repeatedly executed as an interrupt at predetermined time intervals.

Referring to FIG. 8, after the start of the routine, it is first determined in step 140 whether the calculation flag is off. Because the calculation flag is off when the engine is to be restarted after refueling the fuel tank 19, the control proceeds to step 141. In step 141, it is determined whether the feedback control execution condition is in effect. If the feedback control execution condition is not in effect, the control proceeds to step 142. In step 142, the residual fuel chamber pump 27r is activated while the fuel feed chamber pump 27f remains off. Then, in step 143, the value of the fuel property correction coefficient kFr for the fuel in the residual fuel chamber 19r is set as the value of the fuel property correction coefficient kF.

Then, in response to the feedback control execution condition coming into effect, the control proceeds from step 141 to step 144. In step 144, both of the fuel feed chamber pump 27f and the residual fuel chamber pump 27r are activated. Then, in step 145, a routine for calculating the average fuel property correction coefficient kFa is executed as illustrated in FIG. 9.

Figure 9:
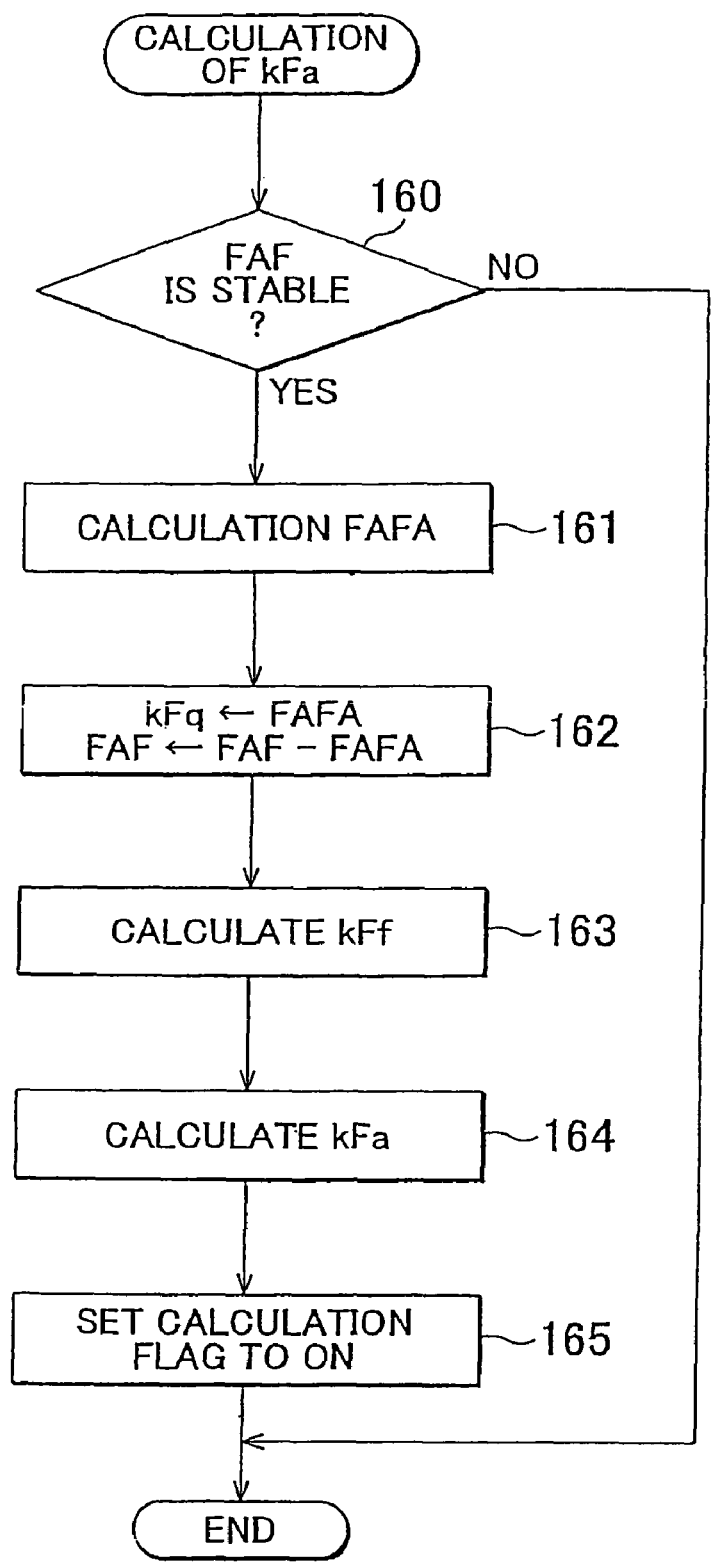
FIG. 9 is a flowchart illustrating a routine for calculating the fuel property correction coefficient kF.

Referring to FIG. 9, after the start of the routine, it is first determined in step 160 whether the value of the feedback correction coefficient FAF has become stable. If not, the present cycle of the routine ends. Conversely, if the value of the feedback correction coefficient FAF has become stable, the control then proceeds to step 161. In step 161, the average feedback correction coefficient FAFA, which represents the average (center of change) of the feedback correction coefficient FAF, is calculated. Then, in step 162, the fuel property correction coefficient kF is increased by the average feedback correction coefficient FAFA and the feedback correction coefficient FAF is reduced by the average feedback correction coefficient FAFA. Then, in step 163, the fuel property correction coefficient kFf for the fuel in the fuel feed chamber 19f is calculated by the expression (3). Then, in step 164, the average fuel property correction coefficient kFa for the mixture of the fuel in the fuel feed chamber 19f and the fuel in the residual fuel chamber 19r is calculated by the expression (2). Finally, in step 165, the calculation flag is set to on.

Back to FIG. 8, in response to the calculation flag being set to on, the control proceeds from step 140 to step 146 where the shutoff valve 20 is opened. Then, in step 147, the fuel feed chamber pump 27f is activated while the residual fuel chamber pump 27r remains off. Then, in step 148, the value of the average fuel property correction coefficient kFa that has been calculated in the routine shown in FIG. 9 is set as the value of the fuel property correction coefficient kF.

Figure 10:
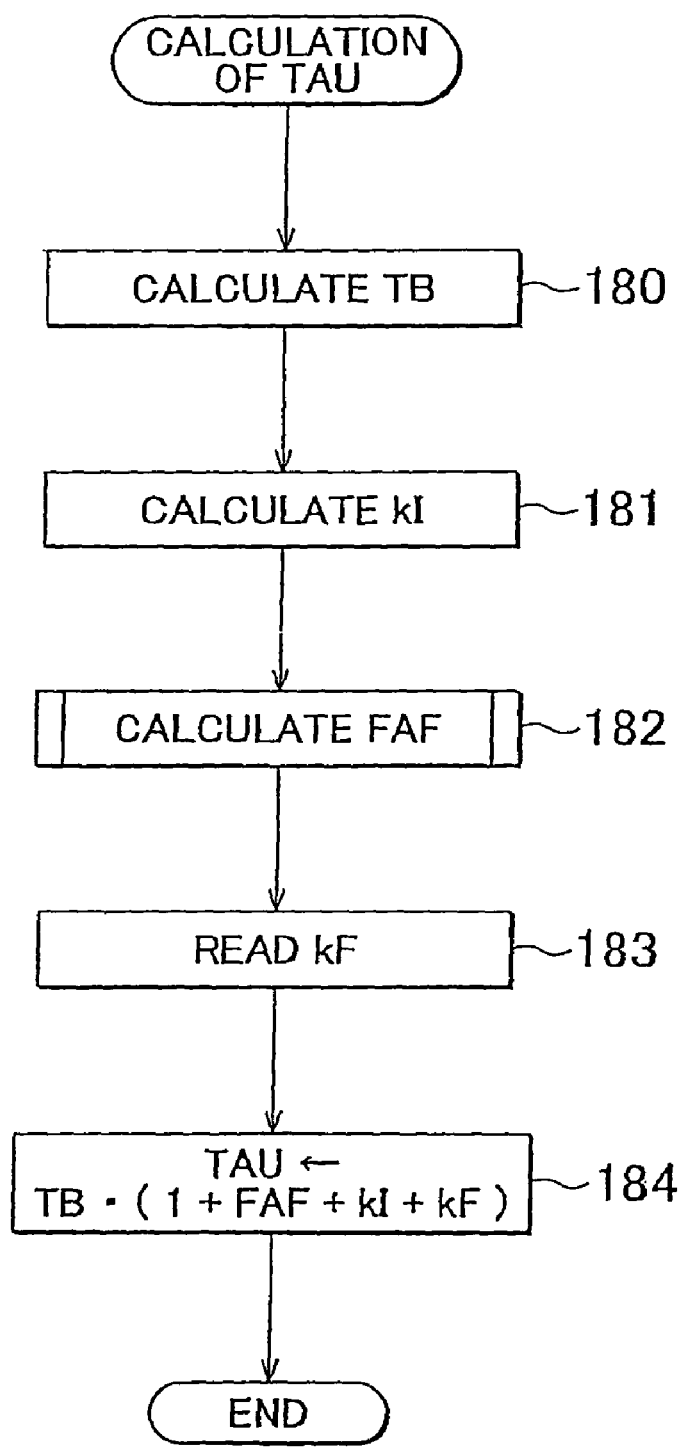
FIG. 10 is a flowchart illustrating a routine for calculating a fuel injection duration TAU.

FIG. 10 shows the routine for calculating the fuel injection duration TAU. This routine is repeatedly executed as an interrupt at predetermined time intervals (corresponding to predetermined crank angles).

Referring to FIG. 10, after the start of the routine, a basic fuel injection duration TB is first calculated in step 180. Then, the increase correction coefficient kI is calculated in step 181. Then, in step 182, the routine for calculating the feedback correction coefficient FAF, which is shown in FIG. 4, is executed. Then, in step 183, the fuel property correction coefficient kF, which has been set in the post-refueling routine shown in FIG. 8, is read out. Then, in step 184, the fuel injection duration TAU is calculated by the expression (1). Thereafter, fuel is injected from the in-cylinder injection valves 18c for the duration TAU.

As is evident from the routine shown in FIG. 8, if the feedback control execution condition is in effect when the engine is to be restarted after refueling the fuel tank 19, the calculation of the average fuel property correction coefficient kFa is immediately carried out. That is, in such a case, it is not necessary to supply only the fuel in the residual fuel chamber 19r to the engine to restart the engine.

Further, it is also possible to control the engine by supplying, after the mixed fuel property correction coefficient kFq has been calculated, the engine with the fuel in the fuel feed chamber 19f and the fuel in the residual fuel chamber 19r at a predetermined ratio (q:(1−q)) while keeping the shutoff valve 20 closed and setting the value of the mixed fuel property correction coefficient kFq as the value of the fuel property correction coefficient kF. Further, it is also possible to control the engine by supplying the engine with the fuel in the fuel feed chamber 19f only while keeping the shutoff valve 20 closed and setting the value of the fuel property correction coefficient kFf as the value of the fuel property correction coefficient kF.

In the internal combustion engine shown in FIG. 1, a single fuel injection valve is provided for each cylinder. More specifically, the single fuel injection valve for each cylinder is an in-cylinder fuel injection valve that is provided within the cylinder (in-cylinder fuel injection valve 18c). However, this single injection valve for each cylinder may be a port injection valve that injects fuel into the intake passage. In this case, however, a portion of the fuel injected from the port injection valve may attach the internal wall of the intake port 7 temporarily and then evaporate and enter the combustion chamber 5. On the other hand, the property of the fuel in the fuel feed chamber 19f is unknown immediately after refueling the fuel tank 19. Therefore, in the case where the evaporation characteristic of the fuel in the fuel feed chamber 19f and that of the fuel in the residual fuel chamber 19r are significantly different from each other, if the fuel in the fuel feed chamber 19f and the fuel in the residual fuel chamber 19r are mixed at a predetermined ratio and then injected from the port injection valves and the mixed fuel property correction coefficient kFq and the average fuel property correction coefficient kFa are calculated, the ratio between the two fuels contained in the fuel mixture that is actually combusted in the combustion chamber 5 deviates from the predetermined ratio. Therefore, the value of the mixed fuel property correction coefficient kFq that is obtained at this time does not accurately identify the property of the fuel mixture containing the two fuels at the predetermined ratio. On the other hand, in the case of in-cylinder injection valves, because fuel is directly injected into each combustion chamber 5, the ratio between the fuels contained in the fuel mixture that is actually combusted in the combustion chamber 5 can be maintained equal to the predetermined ratio.

That is, until the calculations of the mixed fuel property correction coefficient kFq and the average fuel property correction coefficient kFa are finished after refueling the fuel tank 19, preferably, the fuel in the fuel feed chamber 19f is injected from the in-cylinder injection valves 18c while prohibiting the fuel in the fuel feed chamber 19f to be injected from the port fuel injectors.

To this end, in the case of an internal combustion engine in which only a single fuel injection valve is provided in each cylinder as the one shown in FIG. 1, it is preferable to use in-cylinder injection valves, like the in-cylinder injection valves 18c.

Figure 11:
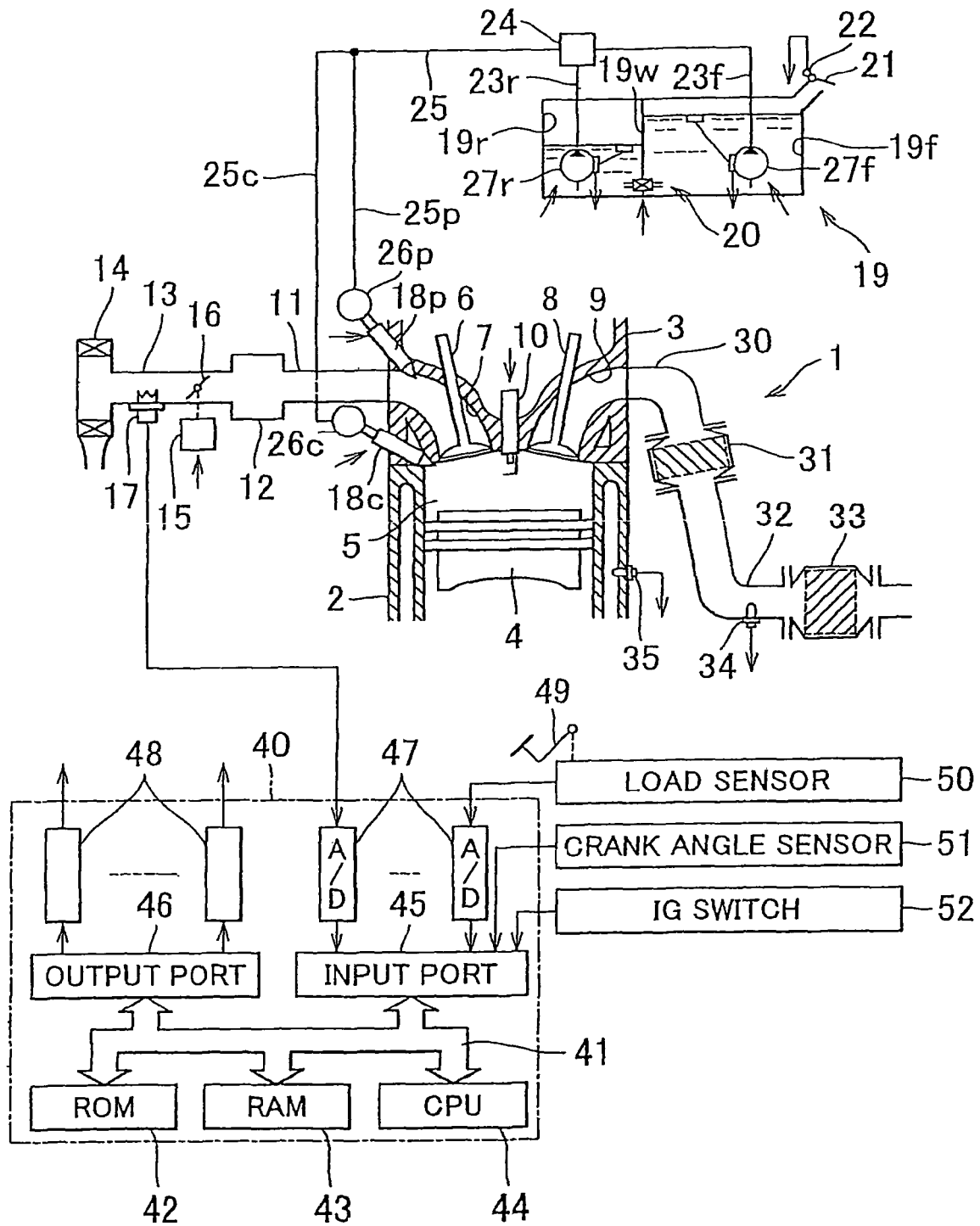
FIG. 11 is a view showing the entire configuration of an internal combustion engine according to another exemplary embodiment of the invention.

Meanwhile, FIG. 11 shows another exemplary embodiment of the invention in which two injection valves, that is, an in-cylinder injection valve 18c and a port injection valve 18p, are provided in each cylinder of the engine. In this exemplary embodiment, a fuel supply pipe 25 extending from the fuel flow rate adjusting device 24 is branched into an in-cylinder injection valve fuel supply pipe 25c and a port injection valve fuel supply pipe 25p. The in-cylinder injection valve fuel supply pipe 25c is connected to the respective in-cylinder injection valves 18c via a delivery pipe 26c, while the port injection valve fuel supply pipe 25p is connected to the respective port injection valves 18p via a delivery pipe 26p. According to this configuration, one or both of the fuel in the fuel feed chamber 19f and the fuel in the residual fuel chamber 19r can be injected into the engine via the respective in-cylinder injection valves 18c, and likewise, one or both of the fuel in the fuel feed chamber 19f and the fuel in the residual fuel chamber 19r can be injected to the engine via the respective port injection valves 18p.

Figure 12:
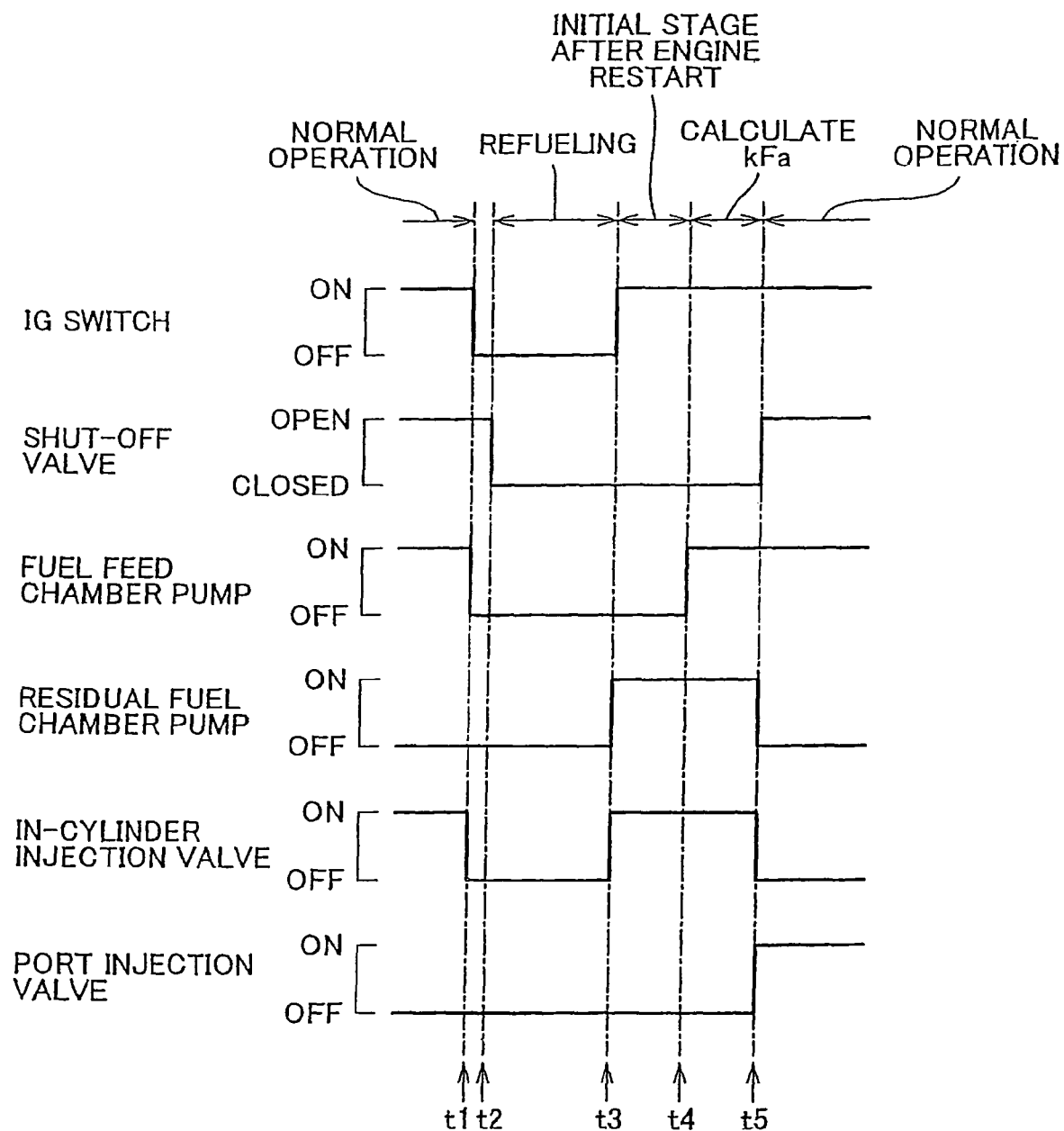
FIG. 12 is a time chart illustrating the exemplary embodiment shown in FIG. 11.

In the exemplary embodiment shown in FIG. 11, when the average fuel property correction coefficient kFa is calculated, as shown at t4 in FIG. 12, both of the fuel feed chamber pump 27f and the residual fuel chamber pump 27r are operated and only the in-cylinder injection valves 18c are operated, so that the fuel in the fuel feed chamber 19f and the fuel in the residual fuel chamber 19r are injected into the engine at a predetermined ratio (q:(1−q)) via the in-cylinder injection valves 18c. As a result, the ratio of the two fuels combusted in each combustion chamber 5 is maintained at the predetermined ratio.

Meanwhile, when the engine is restarted after refueling the fuel tank 19, as indicated at t3 in FIG. 12, only the residual fuel chamber pump 27r is operated and only the in-cylinder injection valves 18c are operated, so that only the fuel in the residual fuel chamber 19r is supplied to the engine via the in-cylinder injection valves 18c. As a result, the fuel can be reliably supplied into each combustion chamber 5 when starting the engine. In this case, it is also possible to use only the port injection valves 18p to supply the fuel in the residual fuel chamber 19r to the engine or to use both of the in-cylinder injection valves 18c and the port injection valves 18p. This is because, because the property of the fuel in the residual fuel chamber 19r is known, it is possible to estimate how much of the fuel that has been injected from the port injection valves 18p will attach the internal wall of the intake port 7.

Meanwhile, during the normal operation, fuel is supplied to the engine via the in-cylinder injection valves 18c and the port injection valves 18p in accordance with, for example, the operation conditions of the engine. For example, when the engine is running under a small engine load, only the in-cylinder injection valves 18c are used to supply fuel to the engine. On the other hand, when the engine is running under a large engine load, only the port injection valves 18p are used to supply fuel to the engine. Also, both of the port injection valves 18p and the in-cylinder injection valves 18c may be used at the same time if necessary. In the example shown in FIG. 12, only the in-cylinder injection valves 18c are used to supply fuel to the engine during the normal operation before refueling of the fuel tank 19, and only the in-cylinder injection valves 18c are used during the normal operation after the calculation of the average fuel property correction coefficient kFa.

Figure 13:
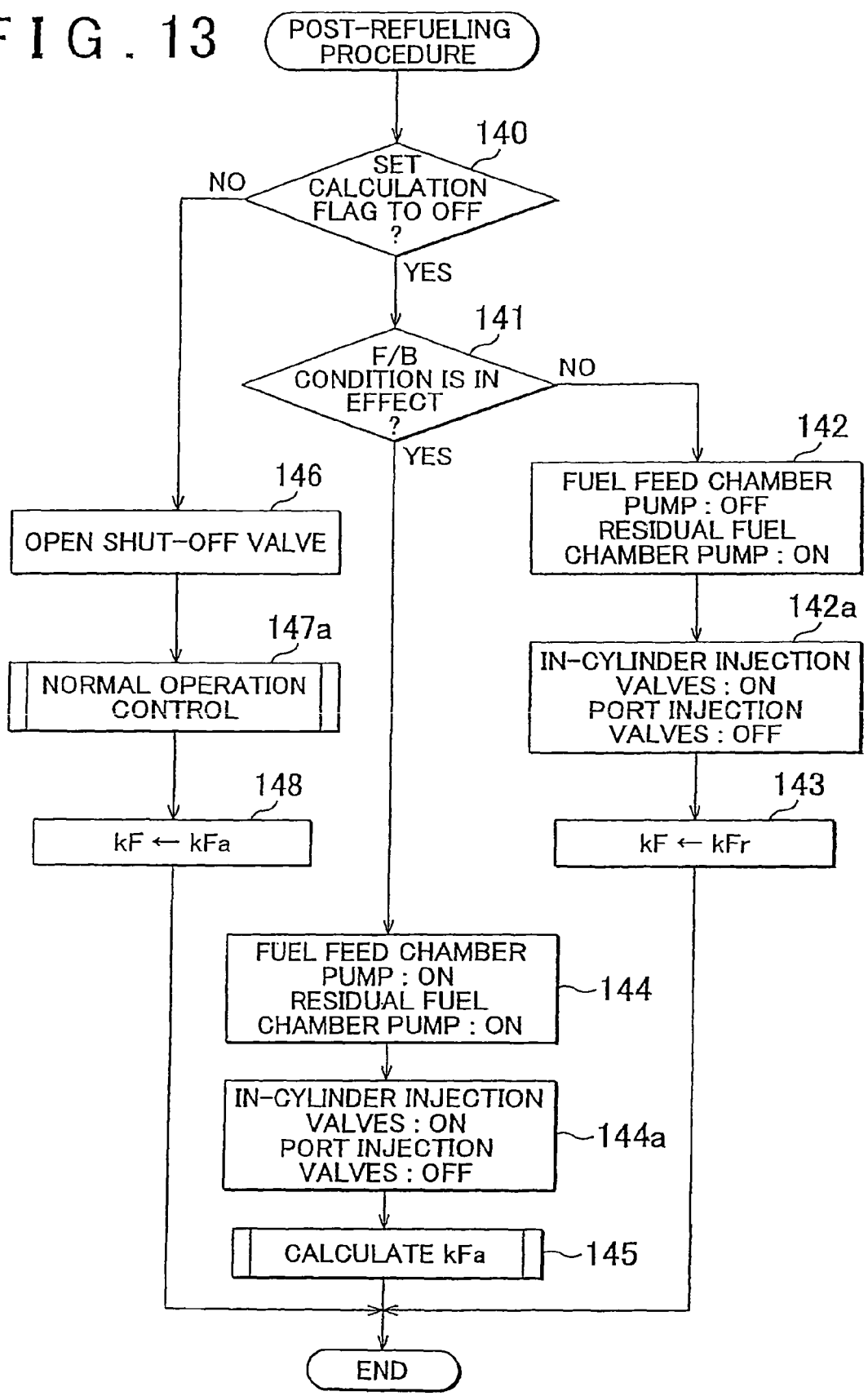
FIG. 13 is a flowchart illustrating a routine that is executed after refueling in the exemplary embodiment shown in FIG. 11.

FIG. 13 shows the routine of a control procedure that is executed after refueling the fuel tank 19 in this exemplary embodiment. This routine is repeatedly executed as an interrupt at predetermined time intervals.

Referring to FIG. 13, after the start of the routine, it is first determined in step 140 whether the calculation flag is off. Because the calculation flag is off when the engine is restarted after refueling the fuel tank 19, the control proceeds to step 141 where it is determined whether the feedback control execution condition is in effect. If the feedback control execution condition is not in effect, the control proceeds to step 142. In step 142, the residual fuel chamber pump 27r is activated while the fuel feed chamber pump 27f remains off. Then, in step 142a, the in-cylinder injection valves 18c are operated while the port injection valves 18p remain off. At this time, the fuel in the residual fuel chamber 19r is injected via each of the in-cylinder injection valves 18c for the fuel injection duration TAU. Then, in step 143, the value of the fuel property correction coefficient kFr for the fuel in the residual fuel chamber 19r is set as the value of the fuel property correction coefficient kF.

Thereafter, in response to the feedback control execution condition coming into effect, the control proceeds from step 141 to step 144. In step 144, the fuel feed chamber pump 27f and the residual fuel chamber pump 27r are both activated. Then, in step 144a, the in-cylinder injection valves 18c are operated while the port injection valves 18p remain off. At this time, the fuel in the fuel feed chamber 19f and the fuel in the residual fuel chamber 19r are injected from the in-cylinder injection valves 18c at a predetermined ratio for the fuel injection duration TAU. Then, in step 145, the routine for calculating the average fuel property correction coefficient kFa, which is shown in FIG. 9, is executed.

In response to the calculation flag being set to on in the routine for calculating the average fuel property correction coefficient kFa, the control proceeds from step 140 to step 146 where the shutoff valve 20 is opened. Then, in step 147a, the fuel feed chamber pump 27f, the residual fuel chamber pump 27r, the in-cylinder injection valves 18c, and the port injection valves 18p are normally operated. Then, in step 148, the value of the average fuel property correction coefficient kFa that has been calculated in the routine of FIG. 9 is set as the value of the fuel property correction coefficient kF.

Note that the structures and effects of the exemplary embodiment shown in FIG. 11 are the same as those in the exemplary embodiment shown in FIG. 1 and therefore their descriptions are omitted.

Figure 14:
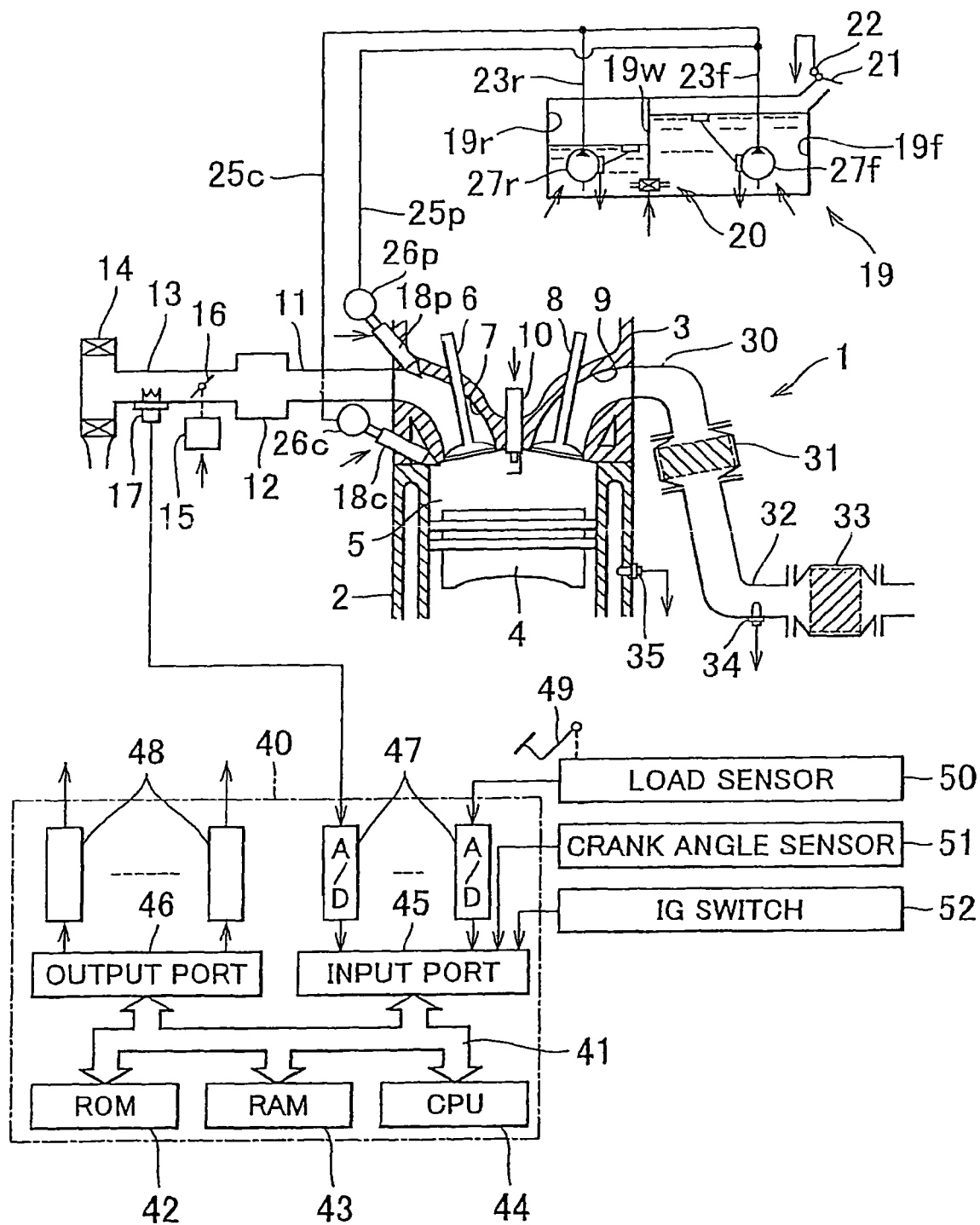
FIG. 14 is a view showing the entire configuration of an internal combustion engine according to a modification example of the exemplary embodiment shown in FIG. 11.

FIG. 14 shows a modification example of the exemplary embodiment shown in FIG. 11. In this example, a fuel supply pipe 23f connected to the fuel feed chamber 19f is branched into an in-cylinder injection valve fuel supply pipe 25c and a port injection valve fuel supply pipe 25p. The in-cylinder injection valve fuel supply pipe 25c is connected to the respective in-cylinder injection valves 18c via a delivery pipe 26c and the port injection valve fuel supply pipe 25p is connected to the port injection valves 18p via a delivery pipe 26p. A fuel supply pipe 23r connected to the residual fuel chamber 19r is connected to the in-cylinder injection valve fuel supply pipe 25c. That is, the fuel supply pipe 23r is not connected to the port injection valve fuel supply pipe 25p. According to this configuration, one or both of the fuel in the fuel feed chamber 19f and the fuel in the residual fuel chamber 19r can be supplied to the engine via the in-cylinder injection valves 18c while only the fuel in the fuel feed chamber 19f can be supplied to the engine via the port injection valves 18p.

As in the exemplary embodiment shown in FIG. 11, in the example shown in FIG. 14, when the engine is to be restarted after refueling the fuel tank 19, as shown at t3 in FIG. 12, only the residual fuel chamber pump 27r is activated, so that only the fuel in the residual fuel chamber 19r is supplied to the engine via the in-cylinder injection valves 18c. As such, the fuel can be reliably supplied into each combustion chamber 5 when starting the engine.

Then, when the average fuel property correction coefficient kFa is calculated, as shown at t4 in FIG. 12, both of the fuel feed chamber pump 27f and the residual fuel chamber pump 27r are activated and only the in-cylinder injection valves 18c are operated. As a result, the ratio of the two fuels combusted in each combustion chamber 5 can be maintained at the predetermined ratio. In this case, the discharge rates of the fuel feed chamber pump 27f and the residual fuel chamber pump 27r are set such that the fuel in the fuel feed chamber 19f and the fuel in the residual fuel chamber 19r are supplied to the engine at the predetermined ratio (q:(1−q)). Thus, the flow rate adjusting device may be omitted.

Figure 15:
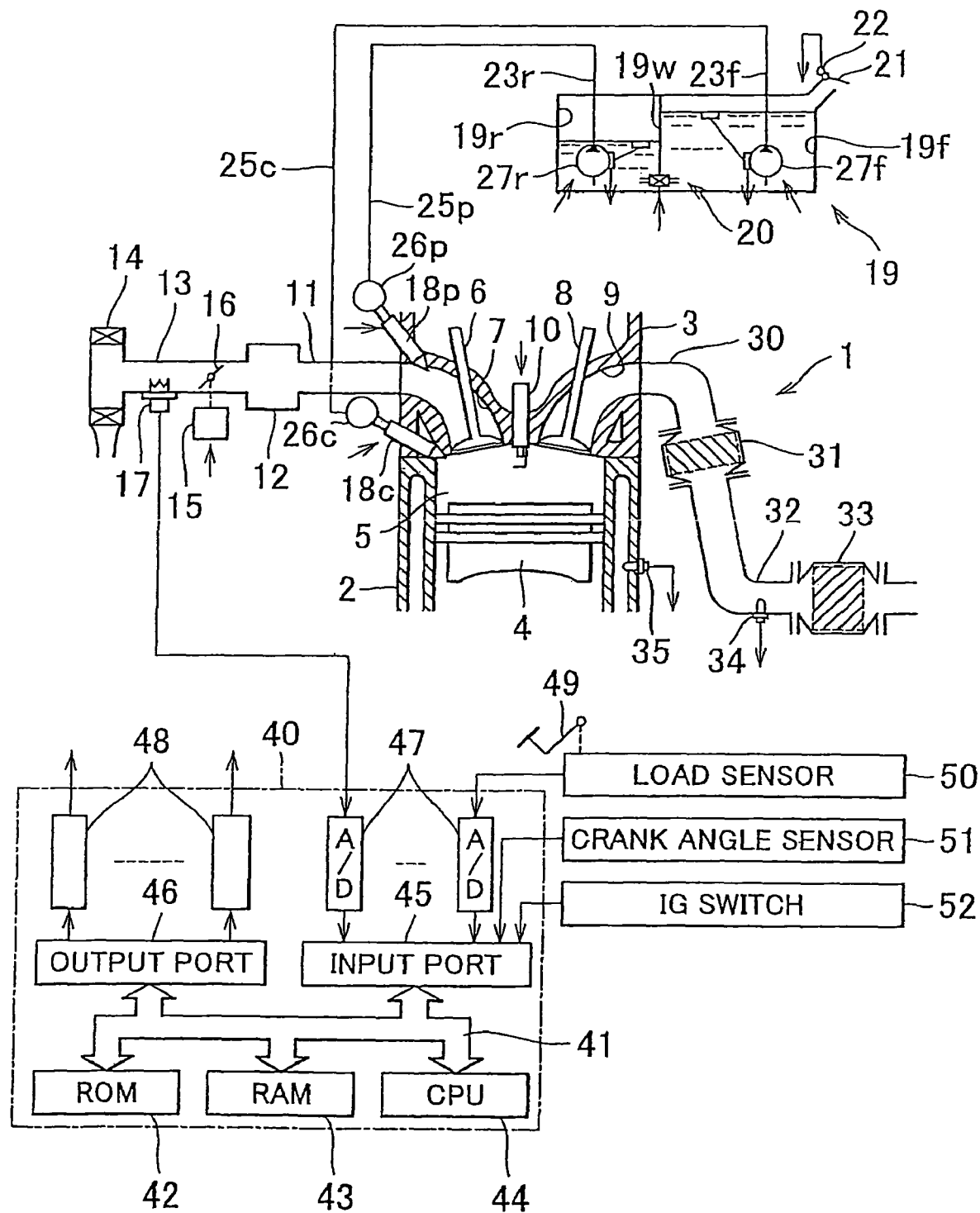
FIG. 15 is a view showing the entire configuration of an internal combustion engine according to still another exemplary embodiment of the invention.

FIG. 15 shows another exemplary embodiment of the invention. In the exemplary embodiment shown in FIG. 15, the in-cylinder injection valves 18c are connected only to the fuel feed chamber 19f via the delivery pipe 26c, the in-cylinder injection valve fuel supply pipe 25c, and the fuel supply pipe 23f, while the port injection valves 18p are connected only to the residual fuel chamber 19r via the delivery pipe 26p, the port injection valve fuel supply pipe 25p, and the fuel supply pipe 23r. According to this configuration, only the fuel in the fuel feed chamber 19f is supplied to the engine via the in-cylinder injection valves 18c while only the fuel in the residual fuel chamber 19r is supplied to the engine via the port injection valves 18p.

Figure 16:
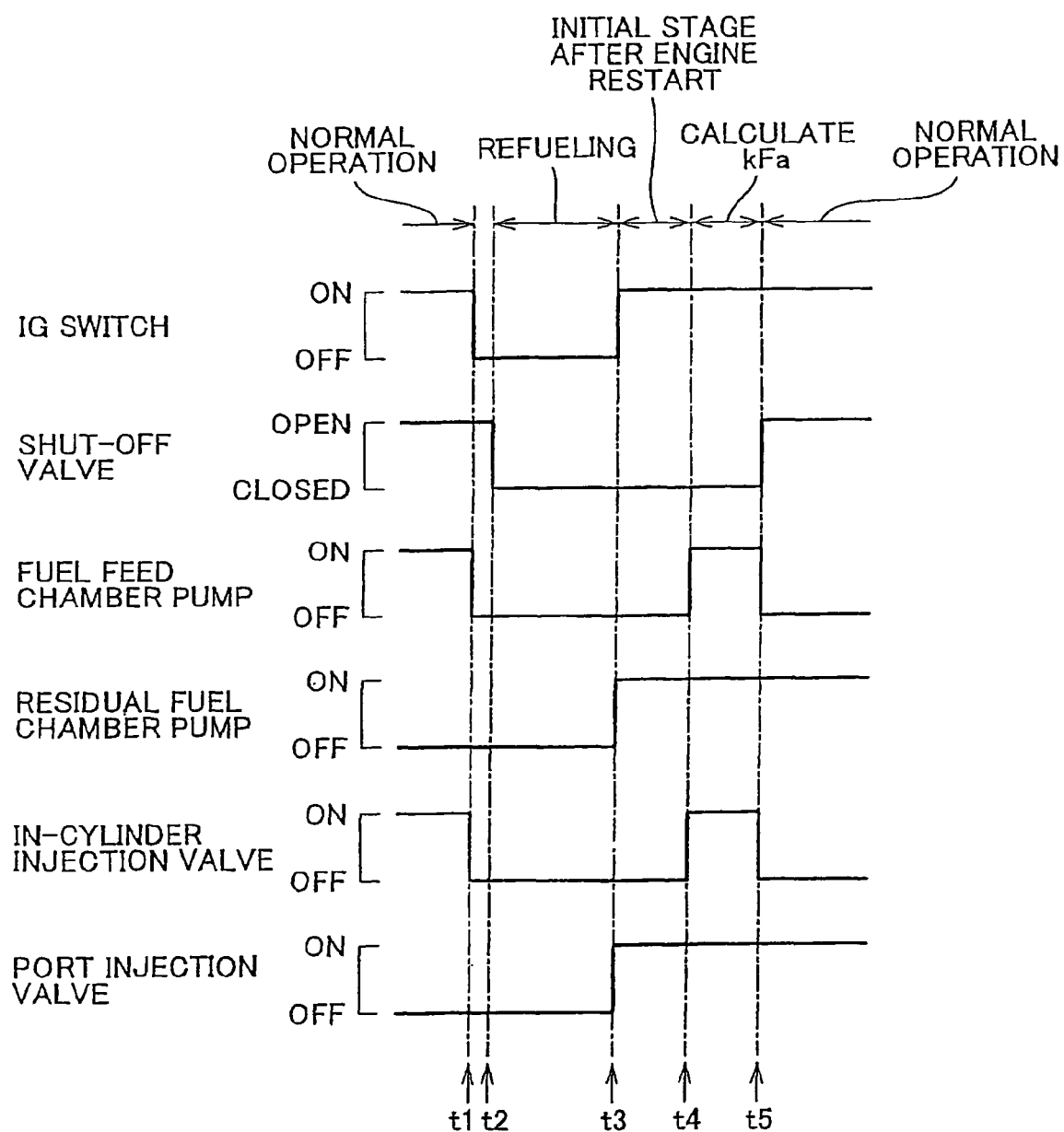
FIG. 16 is a time chart illustrating the exemplary embodiment shown in FIG. 15.

In the example shown in FIG. 15, when the engine is restarted after refueling the fuel tank 19, as shown at t3 in FIG. 16, only the fuel feed chamber pump 27f is activated and only the port injection valves 18p are operated, so that only the fuel in the residual fuel chamber 19r is supplied to the engine via the port injection valves 18p.

Then, when the average fuel property correction coefficient kFa is calculated, as shown at t4 in FIG. 16, the fuel feed chamber pump 27f and the residual fuel chamber pump 27r are both activated and the in-cylinder injection valves 18c and the port injection valves 18p are both operated. In this case, a fuel injection duration TAUC for the in-cylinder injection valves 18c is set to TAU·q, and a fuel injection duration TAUP for the port injection valves 18p is set to TAU·(1−q), so that the fuel in the fuel feed chamber 19f and the fuel in the residual fuel chamber 19r are supplied to the engine at the predetermined ratio (q:(1−q)). Thus, the ratio of the two fuels combusted in each combustion chamber 5 can be maintained at the predetermined ratio, and therefore the flow rate adjusting device may be omitted.

In the example shown in FIG. 15, too, during the normal operation, fuel is supplied to the engine via the in-cylinder injection valves 18c or the port injection valves 18p in accordance with, for example, the operation conditions of the engine. More specifically, for example, when the engine is running under a small engine load, only the in-cylinder injection valves 18c are used to supply fuel to the engine, and when the engine is running under a large engine load, only the port injection valves 18p are used to supply fuel to the engine. Also, the in-cylinder injection valves 18c and the port injection valves 18p may be used at the same time if necessary. On the other hand, in the example shown in FIG. 16, only the port injection valves 18c are used to supply fuel to the engine during the normal operation before refueling of the fuel tank 19, and only the port injection valves 18p are used to supply fuel to the engine during the normal operation after the calculation of the average fuel property correction coefficient kFa.

Figure 17:
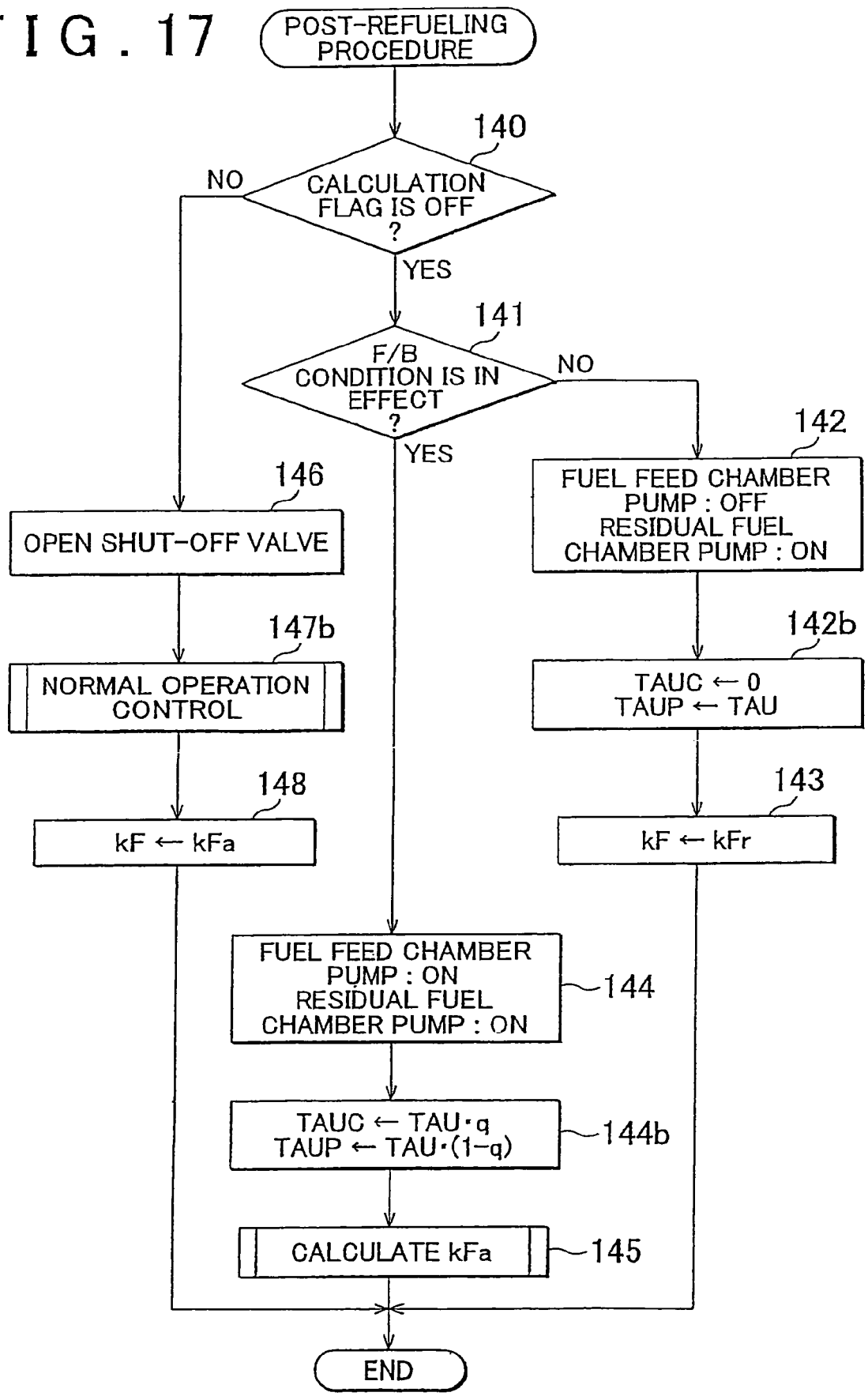
FIG. 17 is a flowchart illustrating a control routine that is executed after refueling in the exemplary embodiment shown in FIG. 15.

FIG. 17 shows a routine of a control procedure that is executed after refueling the fuel tank 19 in the example shown in FIG. 17. This routine is repeatedly executed as an interrupt at predetermined time intervals.

Referring to FIG. 17, after the start of the routine, it is first determined in step 140 whether the calculation flag is off. Because the calculation flag is off when the engine is to be restarted after refueling the fuel tank 19, the control proceeds to step 141. In step 141, it is determined whether the feedback control execution condition is in effect. If the feedback control execution condition is not in effect, the control then proceeds to step 142 where the residual fuel chamber pump 27r is activated while the fuel feed chamber pump 27f remains off. Then, in step 142b, the fuel injection duration TAUC for the in-cylinder injection valves 18c is set to zero, and the value of the fuel injection duration TAUP for the port injection valves 18p is set as the value of the fuel injection duration TAU. That is, in this case, only the fuel in the residual fuel chamber 19r is supplied to the engine via the port injection valves 18p. Then, in step 143, the value of the fuel property correction coefficient kFr for the fuel in the residual fuel chamber 19r is set as the value of the fuel property correction coefficient kF.

Then, in response to the feedback control execution condition coming into effect, the control proceeds from step 141 to step 144 where the fuel feed chamber pump 27f and the residual fuel chamber pump 27r are activated. Then in step 144b, the fuel injection duration TAUC for the in-cylinder injection valves 18c is set to TAU·q, and the fuel injection duration TAUP for the port injection valves 18p is set to TAU·(1−q). That is, in this case, the fuel in the fuel feed chamber 19f is injected from the in-cylinder injection valves 18c and the fuel in the residual fuel chamber 19r is injected from the port injection valves 18p such that the fuel in the fuel feed chamber 19f and the fuel in the residual fuel chamber 19r are supplied to the engine at the predetermined ratio. Then, in step 145, the routine for calculating the average fuel property correction coefficient kFa, which is shown in FIG. 9, is executed.

In response to the calculation flag being set to on in the calculation routine for the average fuel property correction coefficient kFa, the control then proceeds from step 140 to step 146 where the shutoff valve 20 is opened. Then, in step 147b, the fuel feed chamber pump 27f, the residual fuel chamber pump 27r, the in-cylinder injection valves 18c, and the port injection valves 18p are normally operated. Then, in step 148, the value of the average fuel property correction coefficient kFa that has been calculated in the routine shown in FIG. 9 is set as the value of the fuel property correction coefficient kF.

Note that the structures and effects of the exemplary embodiment shown in FIG. 15 are the same as those in the exemplary embodiment shown in FIG. 1 and therefore their descriptions are omitted.

While the invention has been applied to air-fuel ratio control and fuel injection amount control in the exemplary embodiments described above, the invention may also be applied to ignition timing control for setting the optimum ignition timing such as MBT (Minimum Advance for Best Torque) and to engine speed control for maintaining the idling speed at a target level.

In the illustrated embodiments, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

The invention claimed is:

1. A control apparatus for an internal combustion engine, wherein
a fuel feed chamber and a residual fuel chamber that can be selectively connected to and disconnected from each other are provided in a fuel tank,
when the fuel tank is refueled, the fuel feed chamber and the residual fuel chamber, which have been connected so far, are disconnected from each other and fuel is then fed only into the fuel feed chamber to refuel the fuel tank;
when the internal combustion engine is restarted after the refueling of the fuel tank, only the fuel in the residual fuel chamber is supplied to the internal combustion engine while the fuel feed chamber and the residual fuel chamber remain disconnected from each other and the internal combustion engine is controlled in accordance with the property of the fuel in the residual fuel chamber, which has been determined in advance;
the fuel in the fuel feed chamber and the fuel in the residual fuel chamber are supplied to the internal combustion engine at a predetermined ratio in response to a predetermined condition coming into effect after the restart of the internal combustion engine and the property of the mixture of the fuels supplied to the internal combustion engine at the predetermined ratio is determined based on the present value of an engine state amount,
the average property of the fuel in the fuel feed chamber and the fuel in the residual fuel chamber is determined based on the property of the mixture of the fuels supplied to the internal combustion engine at the predetermined ratio and the property of the fuel in the residual fuel chamber, which has been determined in advance,
the fuel feed chamber and the residual fuel chamber are connected to each other to allow the fuel in the fuel feed chamber and the fuel in the residual fuel chamber to be mixed with each other in the fuel tank, and the mixture of the fuels in the fuel tank is supplied to the internal combustion engine from at least one of the fuel feed chamber and the residual fuel chamber and the internal combustion engine is controlled in accordance with the determined average property.

2. The control apparatus according to claim 1, wherein when the internal combustion engine is restarted after the refueling of the fuel tank, only the fuel in the residual fuel chamber is supplied to the internal combustion engine while the fuel feed chamber and the residual fuel chamber remain disconnected from each other, and the internal combustion engine is controlled in accordance with the property of the fuel in the residual fuel chamber, which has been determined in advance, and
the fuel in the fuel feed chamber and the fuel in the residual fuel chamber start to be supplied to the internal combustion engine at the predetermined ratio in response to a predetermined condition coming into effect after the restart of the internal combustion engine.

3. The control apparatus according to claim 1, wherein the internal combustion engine is provided with an in-cylinder fuel injection valve that directly injects fuel into a cylinder of the internal combustion engine and is connected to the fuel feed chamber and the residual fuel chamber, and
the fuel in the fuel feed chamber and the fuel in the residual fuel chamber are supplied at a predetermined ratio from the in-cylinder injection valve to the internal combustion engine.

4. The control apparatus according to claim 3, wherein the internal combustion engine is further provided with an intake passage injection valve that injects fuel into an intake passage and is connected to the fuel feed chamber and to the residual fuel chamber, and
fuel is supplied to the internal combustion engine from the in-cylinder injection valve or from the intake passage injection valve after the fuel feed chamber and the residual duel chamber are connected to each other.

5. The control apparatus according to claim 1, wherein the internal combustion engine is provided with an in-cylinder injection valve that injects fuel into a cylinder of the internal combustion engine and an intake passage injection valve that injects fuel into an intake passage, and
the in-cylinder injection valve is connected to the fuel feed chamber and the intake passage injection valve is connected to the residual duel chamber so that the fuel in the fuel feed chamber is supplied to the internal combustion engine via the in-cylinder injection valve only and the fuel in the residual fuel chamber is supplied to the internal combustion engine via the intake passage injection valve only.

6. The control apparatus according to claim 1, wherein the predetermined condition is that a condition for executing a feedback control of air-fuel ratios is in effect, and
the condition for executing the feedback control of air-fuel ratios is determined to in effect when an air-fuel ratio sensor provided in an exhaust passage of the internal combustion engine has already been activated and the internal combustion engine has already been warmed up.

7. The control apparatus according to claim 1, wherein the engine state amount includes at least one of an average of feedback correction values used to bring an actual air-fuel ratio to a target air-fuel ratio, an optimum igni-tion timing, a knock limit, a combustion pressure, a time at which the combustion pressure peaks, and an idling speed.

8. The control apparatus according to claim 1, wherein the property of the fuel in the fuel feed chamber is determined based on the property of the mixture of the fuels supplied to the internal combustion engine at the predetermined ratio, and
the average property is determined based on the property of the fuel in the fuel feed chamber.

9. The control apparatus according to claim 1, wherein the proportion of the fuel from the fuel feed chamber in the mixture is less than 0.5.

10. The control apparatus according to claim 1, wherein the proportion of the fuel from the fuel feed chamber in the mixture is the ratio between the fuel amount of the fuel in the fuel feed chamber and the fuel amount of the fuel in the residual fuel chamber when the internal combustion engine is restarted after the refueling of the fuel tank.

11. A fuel property determining apparatus for an internal combustion engine having a standard fuel chamber containing a standard fuel, the property of which is known in advance, and a reference fuel chamber containing a reference fuel, the property of which is unknown, wherein
the reference fuel in the reference fuel chamber and the standard fuel in the standard fuel chamber are supplied to the internal combustion engine at a predetermined ratio in response to a predetermined condition coming into effect after the restart of the internal combustion engine and the property of the mixture of the reference and standard fuels supplied to the internal combustion engine at the predetermined ratio is determined based on the present value of an engine state amount, and
the average property of the reference fuel in the reference fuel chamber and the standard fuel in the standard fuel chamber is determined based on the property of the mixture of the reference and standard fuels supplied to the internal combustion engine at the predetermined ratio and the property of the standard fuel in the standard fuel chamber, which has been determined in advance.

12. A control apparatus for an internal combustion engine, comprising:
a fuel tank having a fuel feed chamber and a residual fuel chamber that are connectable to each other;
a fuel supply device that disconnects the fuel feed chamber and the residual fuel chamber from each other when the fuel tank is refueled, and that supplies, when the internal combustion engine is to be restarted after the refueling of the fuel tank, only the fuel in the residual fuel chamber to the internal combustion engine while the fuel feed chamber and the residual fuel chamber remain disconnected from each other; and
a controller that controls the internal combustion engine in accordance with the property of the fuel in the residual fuel chamber that has been determined in advance, wherein
the fuel in the fuel feed chamber and the fuel in the residual fuel chamber are supplied to the internal combustion engine at a predetermined ratio in response to a predetermined condition coming into effect after the restart of the internal combustion engine and the property of the mixture of the fuels supplied to the internal combustion engine at the predetermined ratio is determined based on the present value of an engine state amount, the average property of the fuel in the fuel feed chamber and the fuel in the residual fuel chamber is determined based on the property of the mixture of the fuels supplied to the internal combustion engine at the predetermined ratio and the property of the fuel in the residual fuel chamber, which has been determined in advance, the fuel feed chamber and the residual fuel chamber are connected to each other to allow the fuel in the fuel feed chamber and the fuel in the residual fuel chamber to be mixed with each other in the fuel tank, and the mixture of the fuels in the fuel tank is supplied to the internal combustion engine from at least one of the fuel feed chamber and the residual fuel chamber and the internal combustion engine is controlled in accordance with the determined average property.

13. A control apparatus for an internal combustion engine, comprising:

a fuel tank having a fuel feed chamber and a residual fuel chamber that are connectable to each other;

a fuel supply device that disconnects the fuel feed chamber and the residual fuel chamber from each other when the fuel tank is refueled and that supplies, when the internal combustion engine is restarted after the refueling of the fuel tank, the fuel in the fuel feed chamber and the fuel in the residual fuel chamber to the internal combustion engine at a predetermined ratio while the fuel feed chamber and the residual fuel chamber remain disconnected from each other; and a controller that determines the property of the mixture of the fuels supplied to the internal combustion engine at the predetermined ratio based on an engine state amount that is obtained while the fuels are being supplied to the internal combustion engine at the predetermined ratio and that determines the average property of the fuel in the fuel feed chamber and the fuel in the residual fuel chamber based on the property of the mixture of the fuels supplied to the internal combustion engine at the predetermined ratio and the property of the fuel in the residual fuel chamber, which has been determined in advance, wherein the fuel supply device, after the average property has been determined, connects the fuel feed chamber and the residual fuel chamber to each other so that the fuel in the fuel feed chamber and the fuel in the residual fuel chamber are mixed with each other and supplies the mixture of the fuels to the internal combustion engine from at least one of the fuel feed chamber and the residual fuel chamber, and the controller controls the internal combustion engine in accordance with the determined average fuel property.

14. A fuel property determining apparatus for an internal combustion engine, comprising:

a standard fuel chamber containing a standard fuel, the property of which is known in advance;

a reference fuel chamber containing a reference fuel, the property of which is unknown; and a controller that supplies the standard fuel and the reference fuel to the internal combustion engine at a predetermined ratio in response to a predetermined condition coming into effect after the restart of the internal combustion engine, determines the property of the mixture of the fuels supplied to the internal combustion engine at the predetermined ratio is based on the present value of an engine state amount, and determines the average property of the fuel in the reference fuel chamber and the fuel in the standard fuel chamber based on the property of the mixture of the fuels supplied to the internal combustion engine at the predetermined ratio and the property of the fuel in the standard fuel chamber, which has been determined in advance.

15. A fuel property determining apparatus for an internal combustion engine, comprising:

a first fuel chamber;

a second fuel chamber;

a record device that records the property of the fuel in the first fuel chamber; and a controller that supplies the fuel in the first fuel chamber and the fuel in the second fuel chamber to the internal combustion engine at a predetermined ratio in response to a predetermined condition coming into effect after the restart of the internal combustion engine and the property of the mixture of the fuels supplied to the internal combustion engine at the predetermined ratio is determined based on the present value of an engine state amount, and determines the average property of the fuel in the second fuel chamber and the fuel in the first fuel chamber based on the property of the mixture of the fuels supplied to the internal combustion engine at the predetermined ratio and the property of the fuel in the first fuel chamber, which has been determined in advance.

16. A method for controlling an internal combustion engine, comprising:

disconnecting, when a fuel tank is refueled, a fuel feed chamber and a residual fuel chamber from each other;

supplying, when the internal combustion engine is restarted after the refueling of the fuel tank, only the fuel in the residual fuel chamber to the internal combustion engine while the fuel feed chamber and the residual fuel chamber remain disconnected from each other;

controlling the internal combustion engine in accordance with the property of the fuel in the residual fuel chamber that has been determined in advance, supplying the fuel in the fuel feed chamber and the fuel in the residual fuel chamber to the internal combustion engine at a predetermined ratio in response to a predetermined condition coming into effect after the restart of the internal combustion engine and determining the property of the mixture of the fuels supplied to the internal combustion engine at the predetermined ratio based on the present value of an engine state amount, determining the average property of the fuel in the fuel feed chamber and the fuel in the residual fuel chamber based on the property of the mixture of the fuels supplied to the internal combustion engine at the predetermined ratio and the property of the fuel in the residual fuel chamber, which has been determined in advance, connecting the fuel feed chamber and the residual fuel chamber to each other to allow the fuel in the fuel feed chamber and the fuel in the residual fuel chamber to be mixed with each other in the fuel tank, and supplying the mixture of the fuels in the fuel tank to the internal combustion engine from at least one of the fuel feed chamber and controlling the internal combustion engine in accordance with the determined average property.

17. A method for controlling an internal combustion engine, comprising:

disconnecting, when a fuel tank is refueled, a fuel feed chamber and a residual fuel chamber from each other and supplying, when the internal combustion engine is restarted after the refueling of the fuel tank, the fuel in the fuel feed chamber and the fuel in the residual fuel chamber to the internal combustion engine at a predetermined ratio while the fuel feed chamber and the residual fuel chamber remain disconnected from each other; and determining the property of the mixture of the fuels supplied to the internal combustion engine at the predetermined ratio based on an engine state amount that is obtained while the fuels are being supplied to the internal combustion engine at the predetermined ratio;

determining the average property of the fuel in the fuel feed chamber and the fuel in the residual fuel chamber based on the property of the mixture of the fuels supplied to the internal combustion engine at the predetermined ratio and the property of the fuel in the residual fuel chamber, which has been determined in advance;

connecting, after the average property has been determined, the fuel feed chamber and the residual fuel chamber to each other so that the fuel in the fuel feed chamber and the fuel in the residual fuel chamber are mixed with each other and supplying the mixture of the fuels in the fuel tank to the internal combustion engine from at least one of the fuel feed chamber and the residual fuel chamber, and controlling the internal combustion engine in accordance with the determined average fuel property.

18. A method for determining the property of fuel supplied to an internal combustion engine, comprising:

supplying a standard fuel, which is contained in a standard fuel chamber and the property of which is known in advance, and a reference fuel, which is contained in a reference fuel chamber and the property of which is unknown, to the internal combustion engine at a predetermined ratio in response to a predetermined condition coming into effect after the restart of the internal combustion engine;

determining the property of the mixture of the fuels supplied to the internal combustion engine at the predetermined ratio based on the present value of an engine state amount; and determining the average property of the fuel in reference fuel chamber and the fuel in the standard fuel chamber based on the property of the mixture of the fuels supplied to the internal combustion engine at the predetermined ratio and the property of the fuel in the standard fuel chamber, which has been determined in advance.

* * * * *